US010032265B2

(12) United States Patent
Liu

(10) Patent No.: US 10,032,265 B2
(45) Date of Patent: Jul. 24, 2018

(54) EXPOSING INPAINTING IMAGE FORGERY UNDER COMBINATION ATTACKS WITH HYBRID LARGE FEATURE MINING

(71) Applicant: Sam Houston State University, Huntsville, TX (US)

(72) Inventor: Qingzhong Liu, The Woodlands, TX (US)

(73) Assignee: Sam Houston State University, Huntsville, TX (US)

( * ) Notice: Subject to any disclaimer, the term of this patent is extended or adjusted under 35 U.S.C. 154(b) by 30 days.

(21) Appl. No.: 15/254,325

(22) Filed: Sep. 1, 2016

(65) Prior Publication Data

US 2017/0091588 A1 Mar. 30, 2017

Related U.S. Application Data

(60) Provisional application No. 62/213,446, filed on Sep. 2, 2015.

(51) Int. Cl.
| | |
|---|---|
| *G06K 9/00* | (2006.01) |
| *G06T 7/00* | (2017.01) |
| *G06K 9/46* | (2006.01) |
| *G06K 9/52* | (2006.01) |
| *H04N 7/167* | (2011.01) |

(52) U.S. Cl.
CPC ........ *G06T 7/0002* (2013.01); *G06K 9/00899* (2013.01); *G06K 9/4609* (2013.01); *G06K 9/522* (2013.01); *G06T 2207/20052* (2013.01)

(58) Field of Classification Search
USPC ........ 382/100, 103, 106, 112–116, 154, 162, 382/168, 173, 181, 190, 209, 219, 224, 382/232, 250, 254, 274, 276, 286, 291, 382/294, 305, 312; 348/143; 340/568.1; 705/37; 380/201
See application file for complete search history.

(56) References Cited

U.S. PATENT DOCUMENTS

| | | | | |
|---|---|---|---|---|
| 8,300,890 B1* | 10/2012 | Gaikwad | ............ | G06K 9/00771 382/103 |
| 2009/0290752 A1* | 11/2009 | Kalva | ............... | G06K 9/00711 382/100 |
| 2011/0040666 A1* | 2/2011 | Crabtree | ............ | G06Q 30/0283 705/37 |

(Continued)

*Primary Examiner* — Seyed Azarian
(74) *Attorney, Agent, or Firm* — Meyertons, Hood, Kivlin, Kowert & Goetzel, P.C.; Mark R. DeLuca

(57) ABSTRACT

Methods and systems of detecting tampering in a digital image includes using hybrid large feature mining to identify one or more regions of an image in which tampering has occurred. Detecting tampering in a digital image with hybrid large feature mining may include spatial derivative large feature mining and transform-domain large feature mining. In some embodiments, known ensemble learning techniques are employed to address high feature dimensionality. detecting inpainting forgery includes mining features of a digital image under scrutiny based on a spatial derivative, mining one or more features of the digital image in a transform-domain; and detecting inpainting forgery in the digital image under scrutiny at least in part by the features mined based on the spatial derivative and at least in part by the features mined in the transform-domain.

21 Claims, 13 Drawing Sheets

(56) References Cited

U.S. PATENT DOCUMENTS

| | | | |
|---|---|---|---|
| 2011/0221895 A1* | 9/2011 | Sharma | H04N 7/188 348/143 |
| 2013/0208941 A1* | 8/2013 | Liu | G06T 1/0021 382/100 |
| 2015/0022357 A1* | 1/2015 | Gettings | G01N 21/84 340/568.1 |

* cited by examiner

EXPOSING INPAINTING IMAGE FORGERY UNDER COMBINATION ATTACKS WITH HYBRID LARGE FEATURE MINING

PRIORITY CLAIM

This application claims priority to U.S. Provisional Application Ser. No. 62/213,446 entitled "EXPOSING INPAINTING IMAGE FORGERY UNDER COMBINATION ATTACKS WITH HYBRID LARGE FEATURE MINING" filed Sep. 2, 2015, which is incorporated herein by reference in its entirety.

STATEMENT REGARDING FEDERALLY SPONSORED RESEARCH OR DEVELOPMENT

This invention was made with government support under Grant CCF-1318688 by the U.S. National Science Foundation. The government has certain rights in the invention.

BACKGROUND

Field of the Invention

The present disclosure relates generally to methods for detecting tampering in images. More particularly, aspects of the present disclosure relate to systems and methods for detecting inpainting forgery in digital images, as well as combating anti-forensics.

Description of the Related Art

With the rapid development of multimedia and network, enormous digital multimedia data are daily created and widely spread in the world wide. While the standards of our life and education are greatly improved, as well as many other things including our needs and wants, these data are easily manipulated for malicious or criminal intent, raising serious concern and realistic threats in our society and posing many challenges in digital forensics and information security.

In multimedia forensics, the detection of forgery on joint photographic experts group (JPEG) images is meaningful and challenging work. While being widely facilitated and proliferated by digital techniques, digital multimedia can be easily manipulated without leaving any obvious clue. Steganalysis and forgery detection are two interesting areas with broad impact to each other. While multiple promising and well-designed steganalysis methods have been proposed and several steganographic systems have been successfully steganalyzed, the advance in forgery detection may trail behind.

As a standardized lossy compression, JPEG is the most popular digital image format and standard in our daily life. JPEG image-based forensics has become one of hot spots in multimedia forensics. In terms of the manipulation of JPEG image forgery, generally, the tampering involves several basic operations, such as image resize, rotation, splicing, double compression. The detection of these fundamental manipulations and relevant forgery has been well studied. For example, double JPEG compression is one of most adopted manipulations.

In some cases, the bit stream of a JPEG image is decoded and the manipulation is implemented in spatial domain. The modified image is then compressed back to JPEG format. If the newly adopted quantization table is different from the one used by original JPEG image, the modified JPEG image may be said to have undergone a double JPEG compression. Although JPEG based double compression does not by itself prove malicious or unlawful tampering, it is an evidence of image manipulation.

Some detection methods have been proposed for JPEG double compression, one of common operations that may occur in the tampering manipulation. When the quality of the second compression is higher than the quality of the first compression, some existing methods have obtained good detection results. Existing methods may, however, fall short of accurately detecting the down-recompression when the second compression quality is lower than the first compression quality. A crafty forgery maker may take account of the weakness of the current detection arts, doctor images and produced them in a lower image quality, to escape from being detected.

Inpainting, also known as image completion, is the process to reconstruct lost or corrupted parts of images and videos. Though inpainting, originally designed to reconstruct lost or deteriorated parts of images and videos, inpainting has been used for image tampering, including region filling and object removal to disguise the meaning of objects or conceal the truth. While several types of tampering have been successfully exposed, few studies address the challenge of inpainting forgery in JPEG images.

There are many applications of the inpainting technique, ranging from film restoration, deterioration reverse, to image and video editing and restoration, including but not limited to removal of occlusions, such as texts, subtitles, stamps, logos, watermarks, wrinkles, and unwanted objects from digital images and/or videos. Most inpainting methods in the literature can be mainly classified into geometry- and texture-oriented methods. Geometry-oriented methods are performed by using a partial differential equation (POE), derived from variation principles, showing good performance in propagating smooth level lines or gradients, but undesirable in the presence of texture. Geometry-oriented methods are local in the sense since the PDEs only involve the interactions among neighboring pixels on the image grid. Texture-oriented methods model texture as a probabilistic graphical model. These methods may be referred to as exemplar-based approaches. Bugeau et al. has combined copy-paste texture synthesis, geometric PDEs and coherence among neighboring pixels and proposed a comprehensive framework for image inpainting, being able to approximately minimize proposed energy function.

Several inpainting tools are currently available on the Internet. Cyber criminals may easily obtain these inpainting tools to disguise objects and conceal the truth of digital photos, which might be presented as important evidences for legitimate purposes. As such, there is a heightened need to detect such tampering in digital JPEG images. Several methods have been proposed for JPEG-based forensics, such as the detection of image resize, splicing, double compression and duplication detection. However, regarding the detection of inpainting-based forgery in digital images, such detection is believed to be still underexplored.

Generally, after inpainting manipulation, post-combination attacks can be employed to cover or compromise original inpainting traces. It is very hard to model the processing by inpainting followed by these attacks. Existing methods and system may not be effective in exposing the inpainting forgery from these subsequent combination attacks.

Seam carving, also known as image retargeting, content-aware scaling, liquid resizing or liquid rescaling, is a method developed by Shai Avidan and Ariel Shamir for image resizing. The idea behind the image resizing is to establish a number of paths of least importance, called seams in an image or video file for both reduction and expansion. A seam is an optimal 8-connected path of pixels on a single image from top to bottom, or left to right. Seam carving allows manually defining areas in which pixels may not be changed and features the ability to erase entire objects from an image/photo. Seam carving has been implemented in Adobe Photoshop and other popular computer graphic applications including GIMP, digiKam, ImageMagic, and iResizer. The proliferation of seam carving raises a serious challenge in image forensics.

Although several detectors have been used to detect seam carving-based image forgery, the effort to expose the tampering of low quality images is still missing. A crafty forgery maker may save doctored images/photos into a low quality since it is very difficult to expose the forgery in low quality images.

The methods presented herein address the challenges inherent in detecting forgery in images, particularly low quality JPEG images.

SUMMARY

Systems and methods for detecting inpainting forgery or other tampering in digital images (e.g., JPEG images) are described. In an embodiment, a method of detecting tampering in a digital image includes using hybrid large feature mining to identify one or more regions of an image in which tampering has occurred. Detecting tampering in a digital image with hybrid large feature mining may include spatial derivative large feature mining and transform-domain large feature mining. In some embodiments, known ensemble learning techniques are employed to address high feature dimensionality.

In an embodiment, a method of detecting tampering in a digital image includes mining one or more features of a digital image under scrutiny based on a spatial derivative and mining one or more features of the digital image using at least one DCT transform. Mining the features based on the spatial derivative may include determining a spatial derivative associated with at least a portion of a digital image under scrutiny; and extracting, based on the spatial derivative, one or more neighboring joint density features and/or marginal features from the digital image. Mining the features of the digital image using a DCT transform may include extracting one or more neighboring joint density features and/or marginal joint density features from the digital image; and determining one or more calibration features in a DCT domain based on the neighboring joint density features and/or marginal joint density features. Tampering in the digital image under scrutiny may be detected at least in part by the features mined based on the spatial derivative and at least in part by the features mined using the at least one DCT transform.

In an embodiment, a system includes a tampering detection system implemented on one or more computing devices. The tampering detection system includes a digital image feature extraction component and a digital image tampering detector. The digital image feature extraction component is configured to implement and mining one or more features of a digital image under scrutiny based on a spatial derivative and mining one or more features of the digital image using at least one DC transform. Mining the features based on the spatial derivative may include determining a spatial derivative associated with at least a portion of a digital image under scrutiny; and extracting, based on the spatial derivative, one or more neighboring joint density features and/or marginal features from the digital image. Mining the features of the digital image using a DCT transform may include extracting one or more neighboring joint density features and/or marginal joint density features from the digital image; and determining one or more calibration features in a DCT domain based on the neighboring joint density features and/or marginal joint density features. The digital image tampering detector is configured to implement detecting tampering in the digital image under scrutiny at least in part by the features mined based on the spatial derivative and at least in part by the features mined using the at least one DCT transform.

In an embodiment, a non-transitory, computer-readable storage medium includes program instructions stored thereon. The program instructions, when executed on one or more computers, cause the one or more computers to implement a digital image tampering detection system configured to mine one or more features of a digital image under scrutiny based on a spatial derivative and mine one or more features of the digital image using at least one DCT transform. Mining the features based on the spatial derivative may include determining a spatial derivative associated with at least a portion of a digital image under scrutiny; and extracting, based on the spatial derivative, one or more neighboring joint density features and/or marginal features from the digital image. Mining the features of the digital image using a DCT transform may include extracting one or more neighboring joint density features and/or marginal joint density features from the digital image; and determining one or more calibration features in a DCT domain based on the neighboring joint density features and/or marginal joint density features. Tampering in the digital image under scrutiny may be detected at least in part by the features mined based on the spatial derivative and at least in part by the features mined using the at least one DCT transform.

In some embodiments, detecting inpainting forgery includes mining features of a digital image under scrutiny based on a spatial derivative, mining features of the digital image in a transform-domain; and detecting inpainting forgery in the digital image under scrutiny at least in part by the features mined based on the spatial derivative and at least in part by the features mined in the transform-domain. The mined features may include one or more neighboring joint density features and/or one or more marginal joint density features.

BRIEF DESCRIPTION OF THE DRAWINGS

Advantages of the present invention will become apparent to those skilled in the art with the benefit of the following detailed description of embodiments and upon reference to the accompanying drawings in which.

Figure 1A:
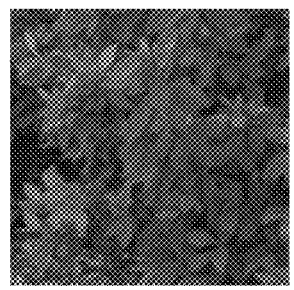
FIG. 1A shows one JPEG image.
Figure 1B:
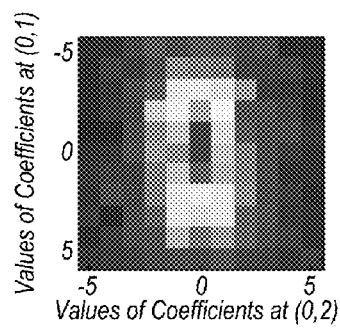
FIGS. 1B-1G shows the neighboring joint densities of the quantized DCT coefficients for the JPEG image at different frequency coordinates.
Figure 1E:
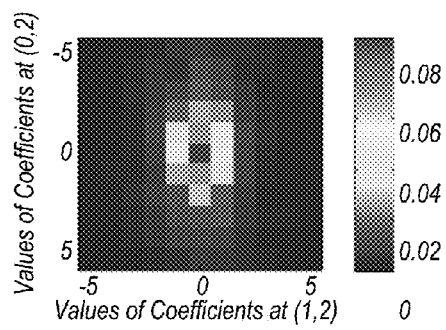
Figure 1C:
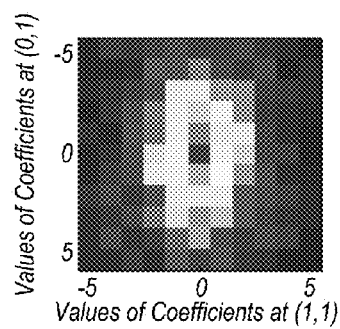
Figure 1F:
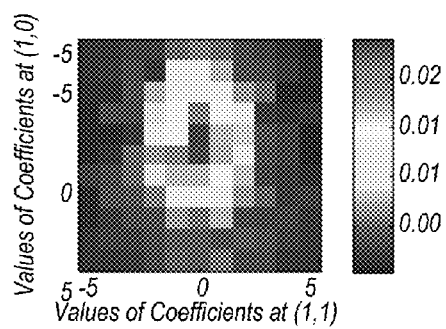
Figure 1D:
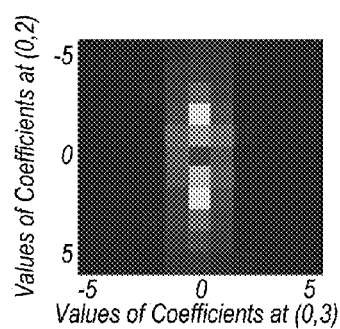
Figure 1G:
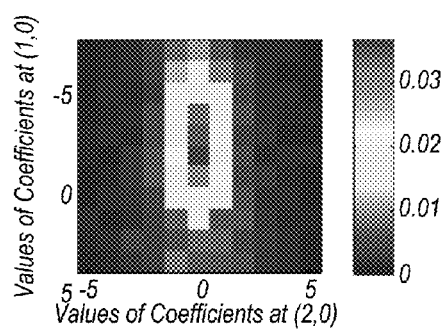

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Methods and systems as described herein may detect tampering in a digital image includes using hybrid large feature mining to identify one or more regions of an image in which tampering has occurred. Detecting tampering in a digital image with hybrid large feature mining may include spatial derivative large feature mining and transform-domain large feature mining. In some embodiments, known ensemble learning techniques are employed to address high feature dimensionality. Forensic analysis may be performed using images that indicate the location of tampering.

In various embodiments, a method extracts rich neighboring joint density features with an ensemble classifier for the detection. Detection may use or adapt neighboring joint density-based steganalysis methods including, but not limited to Liu, Q., Sung, A H. and Qiao, M. 2009. Improved detection and evaluations for JPEG steganalysis, in *Proc. The 17th ACM Multimedia*, pp. 873-876; Liu, Q.2011. Steganalysis of DCT-embedding based adaptive steganography and YASS, *In Proc. The Thirteenth ACM workshop on Multimedia and Security*, pp. 77-86; or Liu, Q., and Chen, Z. 2014 Improved approaches with calibrated neighboring joint density to steganalysis and seam-carved forgery detection in JPEG images, *ACM Transaction on Intelligent Systems and Technology* (each of which is incorporated by reference as if fully set forth herein), and/or a shift-recompression-based approach to detecting cropping and relevant forgery on the same quantization Liu, Q. 2011, Detection of misaligned cropping and recompression with the same quantization matrix and relevant forgery. *In Proc. 3$^{rd}$ International workshop on Multimedia in Forensics and Intelligence*, pages 25-30 (which is incorporated by reference as if fully set forth herein).

In some embodiments, a method and system includes a rich feature mining-based approach that detects JPEG down-recompression and inpainting forgery on the same quantization. Rich neighboring joint density features may be designed according to different frequency coordinates in the DCT domain and under the shift recompression versions. One or more ensemble classifiers may be employed for the detection. In some embodiments, the method detects JPEG down-recompression and/or exposes the inpainting forgery on the same quantization.

In some embodiments, using correlation of neighboring discrete cosine transform (DCT) coefficients in JPEG images, a group of neighboring joint density features across different frequency coordinates under different shift recompressions. Known ensemble learning techniques are used for the detection.

In JPEG compression, the marginal density of DCT coefficients at each frequency may approximately follow the generalized Gaussian distribution (GGD). The GGD model may be described as:

$$\rho(x', \alpha, \beta) = \frac{\beta}{2\alpha\Gamma\left(\frac{1}{\beta}\right)} - \exp\{-(|x|/\alpha)^\beta\} \tag{1}$$

Where $\Gamma(\cdot)$ is the Gamma function, scale parameter $\alpha$ models the width of the PDF peak, and shape parameter $\beta$ models the shape of the distribution.

JPEG double compression may change the marginal density, and the modification depends on the first compression quality and the second compression quality. The detection while the first compression quality may be satisfactory, corresponding to large quantization steps, is lower than the second compression quality, corresponding to small quantization steps. It may however still be hard to satisfactorily detect JPEG down recompression.

By merging marginal density and neighboring joint density in DCT domain, a feature mining-based method may be used to detect JPEG double compression. The detection results using a detection method of Liu et al. and a Markov-process-based approach, are shown in Table 1 (taken from Liu, Q., Cooper, P. A., Chen, L., Cho, H., Chen, Z., Qiao, M., Su, Y., Wei, M. and Sung, A. H. 2013. Detection of JPEG double compression and identification of smartphone image source and post-capture manipulation. *Applied Intelligence* 39(4): 705-726, which is incorporated by reference as if fully set forth herein). The detection accuracy on JPEG down recompression is highlighted by the dashed triangle.

For a better concealment of the tampering, a crafty forgery maker might save a doctored JPEG image at the same or a lower image quality. The original JPEG image quality is assumed at QF1. In various embodiments, systems and methods described herein may be used for detection of the inpainting forgery with the one or more of the following combined attacks:

1) Inpainting manipulation is applied to original JPEG image, the doctored image is saved in JPEG format at the same quality of QF1;
2) Inpainting manipulation is applied to original JPEG image, the doctored image is firstly saved in JPEG format at the same quality of QF1, then resaved in JPEG format at a lower quality of QF2 (QF1>QF2);

3) Inpainting manipulation is applied to original JPEG image, the doctored image is firstly saved in JPEG format at the same quality of QF1, then image filtering is applied and the filtered version is resaved in JPEG format at a lower quality of QF2 (QF1>QF2);
4) Inpainting manipulation is applied to original JPEG image, the doctored image is firstly saved in JPEG format at the same quality of QF1, then image resampling (down scale*) is applied and the rescaled (down scaled) image is resaved in JPEG format at a lower quality of QF2 (QF1>QF2).

Generally, image resampling with up-scale (scaled image size is larger than original image size) is easier to detect, however the downscale detection could be very hard, mostly depending on the scale factor.

Methods and systems that may be employed in various embodiments for feature extraction, modeling, and tampering detection are described in U.S. Pat. No. 8,965,038, by Liu, and Q. Liu, and Z. Chen, "Improved approaches with calibrated neighboring joint density to steganalysis and seam-carved forgery detection in JPEG images". *ACM Transactions on Intelligent Systems and Technology*, vol. 5, no. 4, article 63, December 2014 ("Improved Approaches"), each of which is incorporated by reference as if fully set forth herein.

Detecting Tampering in Digital Images with Hybrid Large Feature Mining

In various embodiments, an empirical approach includes hybrid large feature mining and known ensemble learning techniques in the detection of tampering, such as inpainting forgery. Hybrid large feature mining and known ensemble learning techniques may address high feature dimensionality. In some embodiments, the approach is used in detecting JPEG down recompression. In some embodiments, inpainting forgery under combined attacks is exposed. Methods and systems described herein may fill a gap in image forensics and reveal inpainting forgery from the post-combination attacks in JPEG images. Learning machine and statistical metrics may be employed. Experimental results as described herein show that our approach is effective. The approach may significantly improves the detection of JPEG double compression while the second quality level is much lower than the original quality level.

In one embodiment, an empirical approach with hybrid large feature mining contains the marginal density and joint density features (which may include, in one example, over 100,000 dimensionalities) from the spatial derivatives and the filtered version, and from the DCT domain and the calibrated versions. Known ensemble learning techniques are employed applied to deal with the high feature dimensionality.

In steganalysis, a neighboring joint density-based approach including the calibrated version to JPEG steganalysis and seam carving forgery detection in JPEG images may be used. By integrating marginal density and neighboring joint density, the detection of down-recompression may produce improved results.

Although neighboring joint density-based approach is successful in detecting steganography, JPEG-based resize, and JPEG double recompression, unfortunately, existing approaches may only account the mean joint density over the entire DCT frequency subbands, which essentially ignores the discrimination capability that is directly contributed by each individual frequency subband. Different features from different frequency subbands may play different roles in distinguishing different operations in JPEG images. The average processing in the existing approaches loses such important discriminative information.

To improve the existing neighboring joint density-based approach by moving the feature extraction over the entire frequency subbands to the individual subband, the correlation of the neighbors at each individual subband were evaluated. 10000 natural photos in JPEG at quality 70 were available. The average correlation coefficients of the absolute values of the quantized DCT coefficients at different individual frequency subbands to the right adjacent neighbors are listed in Table I(a). To make a comparison, 5000 random images were produced in which the pixel values were randomly generated by computers. These images were converted in JPEG format at quality 70. Table I(b) shows the same correlation coefficients based on the 5000 images. The coefficient correlation of the absolute array between the frequency subband at (i−1, j−1) and the subband at (i−1, j) is given at the i-th row and the j-th column in the table, for instance, the value 0.43 in Table I(a) is the correlation coefficient of the absolute DCT array between the frequency subband at (0,1) and the subband at (0, 2), and so on.

Table IA presents the average correlation coefficients of the absolute DCT array at different individual frequency subbands—neighboring correlation coefficients for 10000 natural photos. Table IB presents the average correlation coefficients of the absolute DCT array at different individual frequency subbands—neighboring correlation coefficients for 5000 random images. Tables IA and IB demonstrate the neighboring DCT coefficients of natural images are correlated (Table IA) but the random images are uncorrelated (Table IB). The strong correlation in the neighboring pixels of natural images may result in the correlation in the DCT domain, and irrelevance of the neighboring pixels in random images that leads to no correlation in the DCT domain. The further manipulations including information hiding, JPEG double compression, inpainting, etc. may either modify the DCT coefficients or modify the pixel values in natural images, and hence may change the neighboring correlations.

TABLE IA

|      | 0.43 | 0.41 | 0.36 | 0.26 | 0.17 | 0.12 |
|------|------|------|------|------|------|------|
| 0.31 | 0.33 | 0.31 | 0.25 | 0.14 | 0.13 | 0.11 |
| 0.30 | 0.30 | 0.26 | 0.19 | 0.14 | 0.09 | 0.10 |
| 0.27 | 0.24 | 0.20 | 0.14 | 0.09 | 0.07 | 0.07 |
| 0.23 | 0.16 | 0.12 | 0.11 | 0.09 | 0.04 | 0.13 |
| 0.16 | 0.10 | 0.08 | 0.07 | 0.06 | 0.06 | 0.29 |
| 0.10 | 0.06 | 0.06 | 0.08 | 0.14 |      |      |

TABLE IB

|      | 0.00 | 0.00 | 0.00 | 0.00 | 0.00 | 0.00 |
|------|------|------|------|------|------|------|
| 0.00 | 0.00 | 0.00 | 0.00 | 0.00 | 0.00 | 0.00 |
| 0.00 | 0.00 | 0.00 | 0.00 | 0.00 | 0.00 | 0.00 |
| 0.00 | 0.00 | 0.00 | 0.00 | 0.00 | 0.00 | 0.00 |
| 0.00 | 0.00 | 0.00 | 0.00 | 0.00 | 0.00 | 0.00 |
| 0.00 | 0.00 | 0.00 | 0.00 | 0.00 | 0.00 | 0.00 |
| 0.00 | 0.00 | 0.00 | 0.00 | 0.00 |      |      |

Figure 2A:
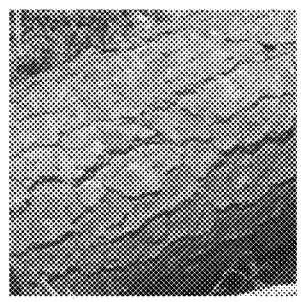
FIG. 2A shows another JPEG image.
Figure 2B:
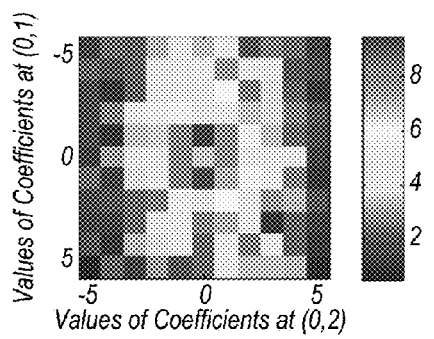
FIGS. 2B-2G shows the neighboring joint densities of the quantized DCT coefficients of the second JPEG image at different frequency coordinates.
Figure 2E:
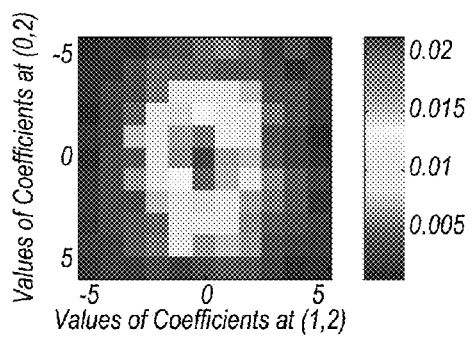
Figure 2C:
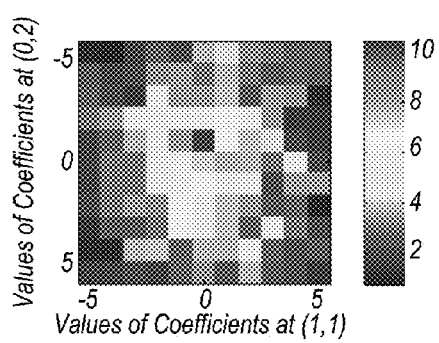
Figure 2F:
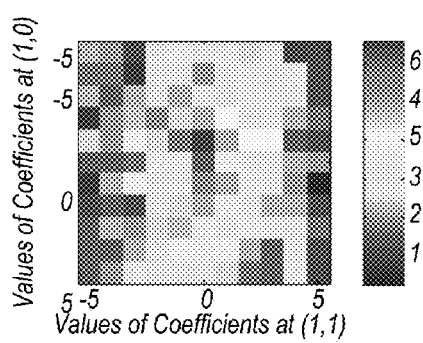
Figure 2D:
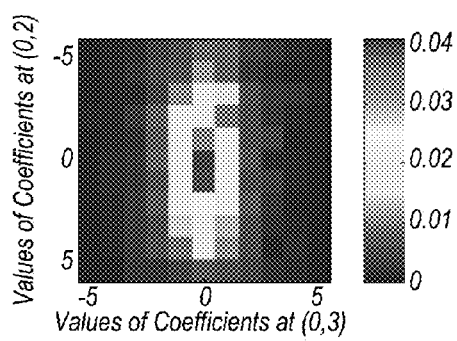
Figure 2G:
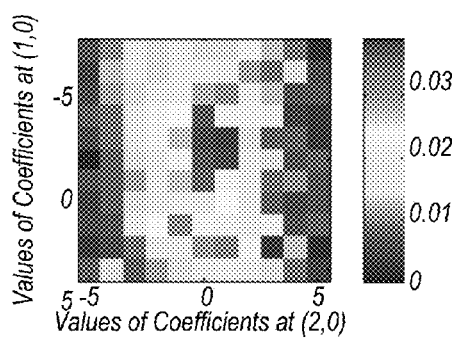

FIG. 1A shows one JPEG image at the quality of "75". FIGS. 1B-1G shows the neighboring joint densities of the quantized DCT coefficients for the JPEG image at different frequency coordinates. FIG. 2A shows another JPEG image at the quality of "75". FIGS. 2B-2G shows the neighboring joint densities of the quantized DCT coefficients of the second JPEG image at different frequency coordinates. These figures demonstrate that the neighboring joint density is generally different at different frequency coordinates and different at the same frequency coordinates across different images. Additionally, the density is approximately symmetric to the lines x=0 and y=0.

In some earlier studies, calibration features were calculated by averaging the features of all 63 shift-recompressions. To detect crop and recompression, different shift compressions may have different characteristics. Therefore, averaging over all 63 shift-recompressions may compromise some significant characteristics of individual shift-recompressions.

In addition, image gradient, derived from the derivatives, has been used as local features such as Harris corner detector and Scale-Invariant Feature Transform (SIFT) in many applications. In audio steganalysis, derivative-based audio steganalysis may be successful in breaking several types of audio steganographic systems.

Although it is very hard to model the inpainting with combined attacks, manipulations of combination attacks may occur both in the spatial domain and in the transform domain, which modify the pixel values and transform coefficients.

Hybrid Large Feature Mining

In various embodiments, tampering is detected using large feature mining based on a hybrid of two or more feature extraction processes. The following describes an embodiment of hybrid large feature mining based on a combination of spatial derivative large feature mining and transform domain large feature mining.

Spatial Derivative Large Feature Mining

Image intensity change over the image is useful information in image analysis and computer vision that has been used for many applications. The intensity change is described with the x and y derivatives $I_x$ and $I_y$, and the image gradient is the vector $\nabla I=[I_x,I_y]^T$. The derivatives may be expanded along different directions over different distances.

The derivative $I_{ij}$ is defined the intensity change along the horizontal distance of i and along the vertical distance of j. Here the sum of i and j is the total offset distance of the derivative. In one embodiment, an image of size m×n may be denoted by the pixel matrix M, $$M = \begin{bmatrix} a_{11} & a_{12} & \ldots & a_{1n} \\ a_{21} & a_{22} & \ldots & a_{2n} \\ \ldots & \ldots & \ldots & \ldots \\ a_{m1} & a_{m2} & \ldots & a_{mn} \end{bmatrix},$$

The derivative matrix of $I_{ij}$ is calculated by $$M_{I_{ij}} = \begin{bmatrix} a_{11} - a_{(j+1)(i+1)} & a_{12} - a_{(j+1)(i+2)} & \ldots & a_{1(n-i)} - a_{(j+1)n} \\ a_{21} - a_{(j+2)(i+1)} & a_{22} - a_{(j+2)(i+2)} & \ldots & a_{2(n-i)} - a_{(j+2)n} \\ \ldots & \ldots & \ldots & \ldots \\ a_{(m-j)1} - a_{m(i+1)} & a_{(m-j)2} - a_{m(i+2)} & \ldots & a_{(m-j)(n-j)} - a_{mn} \end{bmatrix} \quad (1)$$

$$= \begin{bmatrix} I_{ij}(1,1) & I_{ij}(1,2) & \ldots & I_{ij}(1,n-i) \\ I_{ij}(2,1) & I_{ij}(2,2) & \ldots & I_{ij}(2,n-i) \\ \ldots & \ldots & \ldots & \ldots \\ I_{ij}(m-j,1) & I_{ij}(m-j,2) & \ldots & I_{ij}(m-j,n-i) \end{bmatrix}$$

In this case, spatial derivative large feature mining contains the marginal density and neighboring joint density. For computational efficiency and feature reduction, feature extraction may be based on the derivative matrices. An example of an algorithm is described below.

| Derivative large feature mining algorithm |
| --- |
| for d=1:max_d |
|   for i=0:d |
|   j=d-i; |
| % Marginal density of value k is denoted by MFij(h); |
| % δ = 1 if its arguments are satisfied, otherwise 0 |
|     for h=0:max_h |

$$MF_{ij}(h) = \frac{\sum_{r=1}^{m-j} \sum_{c=1}^{n-i} \delta(|I_{ij}(r,c)| = h)}{(m-j)(n-i)} \quad (2)$$

end
% Joint density features along horizontal direction and
% vertical direction are denoted by NJHij(k,l) and NJV(k,l)
    for k=0:max_k
for l=0:max_l $$NJH_{ij}(k,l) = \frac{\sum_{r=1}^{m-j} \sum_{c=1}^{n-i-1} \delta(|I_{ij}(r,c)| = k \ \& |I_{ij}(r,c+1)| = l)}{(m-j)(n-i-1)} \quad (3)$$

$$NJV_{ij}(k,l) = \frac{\sum_{r=1}^{m-j-1} \sum_{c=1}^{n-i} \delta(|I_{ij}(r,c)| = k \ \& |I_{ij}(r+1,c)| = l)}{(m-j-1)(n-i)} \quad (4)$$

end
  end
  end
end

In one experiment, values of 8, 10, 10, and 10 were set to max_d, max_h, max_k and max_l, respectively. 484 marginal density features, and 10,648 joint density features were obtained, in a sub-total of 11,132 features.

Additionally, image filtering may be applied to the image Mp, to obtain at filtered version. In one experiment, by applying the feature extraction algorithm to the filtered version, another 11,132 feature were obtained. Image median filtering may be further improved, as well as the optimal configuration of max_d, max_h, max_k and max_l.

Transform-Domain Large Feature Mining

The quantized DCT coefficient array of the image contains $B_1 \times B_2$ blocks. The Fpq-th block (p=1, 2, ..., B1; q=1, 2, ..., B2) consists of 8×8 quantized DCT coefficients. The coefficient at the frequency coordinate (u,v) of the block Fpq (u=0, 1, ... 7, and v=0, 1, ... 7) is denoted by $c_{pq}(u,v)$ The marginal density of the absolute coefficients is given by absM $$absM(u,v;h) = \frac{\sum_{p=1}^{B_1}\sum_{q=1}^{B_2} \delta(|c_{pq}(u,v)| = h)}{B_1 B_2} \quad (5)$$

The individual frequency-based neighboring joint density on horizontal direction and vertical direction are given by:

$$absNJ_{1h}(u,v;x,y) = \frac{\sum_{p=1}^{B_1}\sum_{q=1}^{B_2} \delta(c_{pq}(u,v) = x \ \& \ c_{pq}(u,v+1) = y)}{B_1 B_2} \quad (6)$$

$$absNJ_{1v}(u,v;x,y) = \frac{\sum_{p=1}^{B_1}\sum_{q=1}^{B_2} \delta(c_{pq}(u,v) = x \ \& \ c_{pq}(u+1,v) = y)}{B_1 B_2} \quad (7)$$

The inter-block neighboring joint density on individual frequency band along the horizontal direction and vertical direction, the features are constructed as follows:

$$absNJ_{2h}(u,v;x,y) = \frac{\sum_{p=1}^{B_1}\sum_{q=1}^{B_2} \delta(c_{pq}(u,v) = x \ \& \ c_{p(q+1)}(u,v) = y)}{B_1(B_2 - 1)} \quad (8)$$

$$absNJ_{2v}(u,v;x,y) = \frac{\sum_{p=1}^{B_1}\sum_{q=1}^{B_2} \delta(c_{pq}(u,v) = x \ \& \ c_{(p+1)q}(u,v) = y)}{(B_1 - 1)B_2} \quad (9)$$

In equations (5) to (9), $\delta=1$ if its arguments are satisfied, otherwise $\delta=0$; h is the integer from 0 to 5, x and y are integers ranging from 0 to 4. The frequency coordinate pair (u, v) is set to (0,1), (1,0), (2,0), (1,1), (0,2), (0,3), (1,2), (2,1), (3,0), (4,0), (3,1), (2,2), (1,3), and (0,4), a subtotal of 84 marginal density features in equation (5), 700 joint density features in equations (6) and (7) on the intra-block, and 700 joint density features in equations (8) and (9) on the inter-block.

The calibration features in the DCT domain is generated according to the following processing:

Decode the JPEG image under examination to spatial domain, which is denoted by matrix M. For d1=0 to 7, and d2=0 to 7, while (d1,d2) (0,0):

Crop the matrix M by d1 rows and d2 columns in the spatial domain, (d1, d2) $\in\{(0,1), \ldots, (0, 7), (1,0), \ldots, (7,7)\}$ and generate a shifted spatial image $M_{d_1,d_2}$;

Compress the shifted spatial image $M_{d_1 d_2}$ to the JPEG format at the same quality factor;

Extract the marginal density and neighboring joint density features calculated by equations (5), (6), (7), (8), and (9) respectively.

In one example, in the DCT domain, 64*(84+700+700)=94,976 features are extracted, denoted herein by LF-DCT (large features in DCT transform). By integrating all features from both the spatial domain and the DCT domain together, a total of 117,240 features, denoted by LF-SDCT (large features in spatial derivatives and in DCT transform), are generated.

EXPERIMENTS

Detection of JPEG Down-Recompression

Since most tampering operations in JPEG images involve JPEG double compression, and most detection methods are not so well while the second compression quality is much lower than the original compression quality, a hybrid large feature mining-based approach was examined for discriminating JPEG down recompression from the single compression.

10,000 never compressed raw-format photos were obtained using four digital cameras Nikon D3100, Samsung GX-10, Cannon Rebel EOS T2i, and Olympus PEN E-PL1. 10,000 singly compressed JPEG images were produced at the quality factor of '40' (QF=40), 50,000 aligned and 50,000 misaligned JPEG down-compressed image at the second quality factor QF2 of '40' and the first compression qualities QF1 were set to 90, 80, 70, 60, and 50 respectively (10,000 for misaligned and 10,000 for aligned at each first compression quality). The size of each image is 512×512. In steganalysis, a fisher linear discriminant (FLD)-based ensemble learning demonstrates very good performances in dealing with high dimensional features. In principle, the FLD ensemble is a random forest of L base learners implemented as FLDs trained on uniformly randomly selected dsub-dimensional subsets F1 ... FL of the feature space. The efficiency of the FLD ensemble classifier comes from fusing the decisions of L such base learners and choosing dsub<<d, where d is the full feature dimensionality. 30 experiments were run to distinguish between single compression and each type of down-recompression. In each experiment, 50% samples from single compression and 50% from the down-recompression were randomly selected for training and the remainders are used for testing.

Detection accuracy was improved by about 32% to 45%, compared to some previous methods, unfortunately, the method was not examined for the detection of JPEG down-recompression. The method in Q. Liu, P. A. Cooper, L. Chen, H. Cho, Z. Chen, M. Qiao, Y. Su, M. Wei, and A. H. Sung, "Detection of JPEG double compression and identification of smartphone image source and post-capture manipulation", *Applied Intelligence*, vol. 39, no. 4, pp. 705-726, 2013 ("Detection of JPEG Double Compression") performs well in detecting JPEG down recompression. Therefore, hybrid feature mining-based approach is compared to previous detection methods Detection of JPEG Double Compression and Q. Liu, "Detection of misaligned cropping and recompression with the same quantization matrix and relevant forgery". In *Proc. 3rd International ACM workshop on Multimedia in Forensics and Intelligence*, pages 25-30, 2011, and another popular method, T. Bianchi and A. Piva, "Detection of non-aligned double JPEG compression based on integer periodicity maps". *IEEE Trans. Inf. Forensics Security*, vol. 7, no. 2, pp. 842-848, 2012 ("Integer Periodicity Maps"). The detection results indicated significant improvement of hybrid large feature mining-based approach over compared methods, shown by Table II. Table II depicts the mean detection accuracy (%) for detecting down-recompression ($QF_2$=40) and the single compression (QF=40) by the methods set forth herein (Proposed) and prior art methods [1], [2], and [3]. [1] is the method set forth in Liu et al. "Detection of JPEG double compression and identification of smartphone image source and post-capture manipulation" Applied Intelligence, vol. 39, no. 4, pp. 705-726, 2013 (incorporated herein by reference). [2] is the method set forth in Liu et al. "Detection of misaligned cropping and recompression with the same quantization matrix and relevant forgery" In Proc. 3rd International ACM workshop on Multimedia in Forensics and Intelligence, pages 25-30, 2011 (incorporated herein by reference). [3] is the method set forth in Bianchi et al. "Detection of non-aligned double JPEG compression based on integer periodicity maps" IEEE Trans. Inf. Forensics Security, vol. 7, no. 2, pp. 842-848, 2012 (incorporated herein by reference).

TABLE II

Mean Detection Accuracy (%)

| | Aligned | | | | Misaligned | | | |
|---|---|---|---|---|---|---|---|---|
| $QF_1$ | Proposed | [1] | [2] | [3] | Proposed | [1] | [2] | [3] |
| 50 | 99.5 | 99.0 | 81.6 | 87.2 | 99.4 | 70.2 | 98.6 | 54.1 |
| 60 | 99.8 | 98.8 | 89.7 | 73.1 | 99.0 | 66.7 | 96.4 | 55.1 |
| 70 | 100 | 99.6 | 94.3 | 92.4 | 97.1 | 63.2 | 90.9 | 55.0 |
| 80 | 99.0 | 95.8 | 64.7 | 69.7 | 92.7 | 62.5 | 79.1 | 54.0 |
| 90 | 97.8 | 93.5 | 69.4 | 64.5 | 80.9 | 61.5 | 66.8 | 51.8 |

Detection of JPEG Down-Scaling and Down-Recompression

A crafty forgery maker may try to evade the proposed detection method by resampling before the second JPEG compression. Regarding JPEG recompression with the image rescaling, methods described herein may be used to detect the integration of JPEG rescaling followed by the recompression with the same quantization table. Different interpolation methods were examined including nearest-neighboring interpolation, bilinear interpolation, cubic interpolation, interpolation with a box-shaped kernel, interpolation with a Lanczos-2 kernel and interpolation with a Lanczos-3 kernel. Different interpolation methods may lead to a slight different detection performance, but the detection performance mainly depends on the scaling factor, not on the different interpolation methods.

Generally, the detection of up-scaling (scaling factor is larger than 1) is much better than the detection of down-scaling (scaling factor is smaller than 1). Bianchi and Piva designed a method to detect JPEG double compression with image rescaling. Their implementation is based on the detection of JPEG recompression with nearest-neighboring interoperation. To compare these two detection methods, 2500 never compressed images were selected, and these images were compressed to the quality from 40 to 90 with the step of 10, respectively. Then, the singly compressed images with the qualities of 50 to 90 are rescaled by using nearest-neighboring interpolation at the scale factors of 0.6, 0.7, 0.8, and 0.9, respectively. Finally these rescaled JPEG images were saved at the lower quality of 40. The detection is to distinguish these down-scaling and down-recompressed images from the single JPEG compression at the quality of 40 (generally the detection of down-scaling is more challenging than the detection of up-scaling).

Table III depicts the mean detection accuracy (%) for detecting downscaling and down-recompression ($QF_2$=40) and the single compression (QF=40) by the methods set forth herein (Proposed) and prior art methods [4] and [5]. The mean detection accuracy was determined over 30 experiments by using these three detection methods. The results demonstrate the significant detection accuracy improvement by the Proposed approach over existing methods. [4] is the method set forth in Liu et al. "A new approach for JPEG resize and image splicing detection" In Proc. 1st ACM workshop on Multimedia in Forensics, pp 43-48, 2009 (incorporated herein by reference). [5] is the method set forth in Bianchi et al. "Reverse engineering of double JPEG compression in the presence of image resizing" Proceedings of 2012 IEEE International Workshop on Information Forensics and Security, pp. 127-132 (incorporated herein by reference).

TABLE III

Mean Detection Accuracy (%)

| | | Detection accuracy | | |
|---|---|---|---|---|
| $QF_1$ | Scale factor | Proposed | [4] | [5] |
| 50 | 0.6 | 98.2 | 79.8 | 54.9 |
| | 0.7 | 81.2 | 64.7 | 54.0 |
| | 0.8 | 99.2 | 94.3 | 51.9 |
| | 0.9 | 93.4 | 61.2 | 52.1 |
| 60 | 0.6 | 98.2 | 79.2 | 54.9 |
| | 0.7 | 79.8 | 64.8 | 53.7 |
| | 0.8 | 99.3 | 94.3 | 50.2 |
| | 0.9 | 92.7 | 62.0 | 51.6 |
| 70 | 0.6 | 98.0 | 78.9 | 55.0 |
| | 0.7 | 79.5 | 64.6 | 53.9 |
| | 0.8 | 99.5 | 94.2 | 50.5 |
| | 0.9 | 92.1 | 59.8 | 52.1 |
| 80 | 0.6 | 97.8 | 78.8 | 55.3 |
| | 0.7 | 79.4 | 64.6 | 54.3 |
| | 0.8 | 99.3 | 94.4 | 49.7 |
| | 0.9 | 92.1 | 59.8 | 52.1 |
| 90 | 0.6 | 97.6 | 78.8 | 54.4 |
| | 0.7 | 79.9 | 64.4 | 52.6 |
| | 0.8 | 99.4 | 94.2 | 50.5 |
| | 0.9 | 91.5 | 60.0 | 52.5 |

Detection of Inpainting Forgery Under Combined Attacks

After comparing several open source tools on image inpainting, the Teorex inpainting tool at http://www.theinpaint.com/ was selected for tampering since it appeared to deliver the best inpainting outcomes without any perceivable disguise. Different types of combination attack experiments, described in the following.

Combination Attack 1: Original images are in JPEG format at the quality of '75' and resaved in JPEG format at the quality of '75' (untouched). After applying inpainting to the original images in JPEG format at the quality of '75', the doctored images are saved in JPEG format at the same quality factor of '75' (forgery).

Combination Attack 2: Original images are in JPEG format at the quality of '75', and resaved in JPEG format at the quality of '75', and finally resaved in JPEG format at the quality "40' (untouched). After applying inpainting to the original images in JPEG format at the quality of '75', the doctored images are saved in JPEG at the quality of '75', and then resaved in JPEG format at the quality of '40' (forgery).

Combination Attack 3: Original images are in JPEG format at the quality of '75', resaved in JPEG format at the quality of '75', followed by down-scaling, and finally stored in JPEG format at the quality "40' (untouched). After applying inpainting to the original images in JPEG format at the quality of '75', the doctored images are saved in JPEG at the quality of '75', followed by down-scaling and then stored in JPEG at the quality of '40' (forgery).

Combination Attack 4: Original images are in JPEG format at the quality of '75', resaved in JPEG format at the quality of '75', followed by image filtering, and finally stored in JPEG format at the quality "40' (untouched). After applying inpainting to the original images in JPEG format at the quality of '75', the doctored images are saved in JPEG at the quality of '75', followed by image filtering and then stored in JPEG at the quality of '40' (forgery). Image median filtering was adopted in this attack.

In attacks 1 and 2, two different sizes of images were conducted: a) 256×256, 6000 untouched and 6000 tampered images; and b) 128×128, 12300 untouched and 12300 tampered. In attacks 3 and 4, 6000 untouched and 6000 tampered images were examined on the size of 256×256. The goal was to discriminate the forgery from the untouched under these different combination attacks. Since no other methods have been established to detect such inpainting forgery under combination attacks that aim to compromise or cover original inpainting forgery, the detection performance is compared among hybrid large feature mining, absNJ, Q. Liu, A. H. Sung, and M. Qiao. "Neighboring joint density-based JPEG steganalysis". *ACM Transactions on Intelligent Systems and Technology*, vol. 2, no. 2, article 16, 2011, and CC-absNJ (described in "Improved Approaches") detectors.

Table IV lists the mean detection accuracy (%) in attack 1 over 30 experiments by applying the ensemble classifier J. Kodovsky, J., Fridrich, and V. Holub, "Ensemble classifiers for steganalysis of digital media". *IEEE Trans. Inf. Forensics Security*, vol. 7, no. 2, pp. 432-444, 2012 in attack 1 (doctored image stored at the same quality '75').

TABLE IV

Mean Detection Accuracy (%) in Attack 1

| Detector | Mean Detection Accuracy | |
|---|---|---|
| | 256 × 256 | 128 × 128 |
| absNJ | 73.2 | 68.1 |
| CC-absNJ | 77.3 | 75.3 |
| LF-SD | 98.1 | 84.8 |
| LF-DCT | 98.2 | 87.1 |
| LF-SDCT | 99.7 | 96.7 |

Table V lists the mean detection accuracy (%) over 30 experiments in attack 2 (doctored images saved in JPEG at quality '75' and then restored in JPEG at the quality '40').

TABLE V

Mean Detection Accuracy (%) in Attack 2

| Detector | Detection accuracy over the two sizes | |
|---|---|---|
| | 256 × 256 | 128 × 128 |
| absNJ | 69.7 | 69.9 |
| CC-absNJ | 72.2 | 70.6 |
| LF-SD | 96.3 | 91.6 |
| LF-DCT | 97.6 | 90.3 |
| LF-SDCT | 97.5 | 97.5 |

Table VI lists the mean detection accuracy (%) over 30 experiments in attack 3 (doctored images saved in JPEG at quality '75', followed by down-scaling in JPEG at quality '40').

TABLE VI

Mean Detection Accuracy (%) in Attack 3

| Detector | Scale factor | Detection accuracy |
|---|---|---|
| absNJ | 0.5 | 71.4 |
| | 0.6 | 68.9 |
| | 0.7 | 69.2 |
| | 0.8 | 69.2 |
| CC-absNJ | 0.5 | 72.4 |
| | 0.6 | 69.7 |
| | 0.7 | 69.9 |
| | 0.8 | 69.7 |
| LF-SD | 0.5 | 99.1 |
| | 0.6 | 79.0 |
| | 0.7 | 79.3 |
| | 0.8 | 79.8 |
| LF-DCT | 0.5 | 98.6 |
| | 0.6 | 78.6 |
| | 0.7 | 79.4 |
| | 0.8 | 79.3 |
| LF-SDCT | 0.5 | 99.1 |
| | 0.6 | 81.4 |
| | 0.7 | 81.8 |
| | 0.8 | 81.6 |

Table VII list the mean accuracy over 30 experiments in attack 4 (doctored images saved in JPEG at quality '75', followed by median filtering in JPEG at quality '40').

TABLE VII

Mean Detection Accuracy (%) in Attack 4

| Detector | Detection Accuracy |
|---|---|
| absNJ | 71.9 |
| CC-absNJ | 73.9 |
| LF-SD | 98.7 |
| LF-DCT | 97.4 |
| LF-SDCT | 98.9 |

In each experiment (Tables IV-VII), 50% observations are randomly selected for training and other 50% observations are used for testing. The outcomes of testing are classified as True Positive (TP), False Positive (FP), False Negative (FN), and True Negative (TN). The detection accuracy is calculated by 0.5*TP/(TP+FN)+0.5*TN/(TN+FP).

The experimental results show that proposed large feature mining-based detectors considerably outperform original neighboring joint density-based detector, absNJ and the calibrated version CC-absNJ, and effectively expose the inpainting forgery under the combined attacks.

Detection of Inpainting Forgery Under Combined Attacks in Photos

Existing techniques may not be effective in exposing inpainting forgery from the doctored images under the combined attacks that aim to compromise or cover the inpainting traces. Most existing inpainting forgery detection methods also demand large computational cost, therefore, the method described herein was not compared with other existing inpainting detection methods in the combination attacks 1 to 4.

In inpainting forgery detection, methods based on zero-connectivity feature and fuzzy membership have been proposed. A detection method based on multi-region relation has also been proposed. Some methods of inpainting forgery detection utilized the computation of a dense motion field by PatchMatch-based detector algorithm. The approach described herein is compared to the blind inpainting forgery detection.

Additionally, the detection of copy-paste or copy-move forgery has been widely investigated. It is possible to adopt the detection of copy-move forgery for inpainting forgery detection although the challenging level of inpainting detection is much higher than copy-move forgery detection. Some methods investigate the 15 most prominent feature sets for copy-move forgery detection. These methods show that "a keypoint-based method", e. g. based on SIFT features, can be very efficiently executed. Its main advantage is the remarkably low computational load, combined with good performance. Keypoint-based methods, however, are sensitive to low-contrast regions and repetitive image content", and "block-based methods can clearly improve the detection results". Among block-based methods, some researchers recommended the use of ZERNIKE. Based on their experiments and conclusions, ZERNIKE methods were adopted as the second comparison method.

In the examination study set forth below, a fast copy-move forgery detection designed was examined with the outcome of very low computational cost and good detection performance. For this experiment, the fast copy-move forgery detection method is adopted as the third comparison method. While the above three detection methods were all applied, all detection parameters were set to the optimal according to the authors' recommendations.

Figure 3:
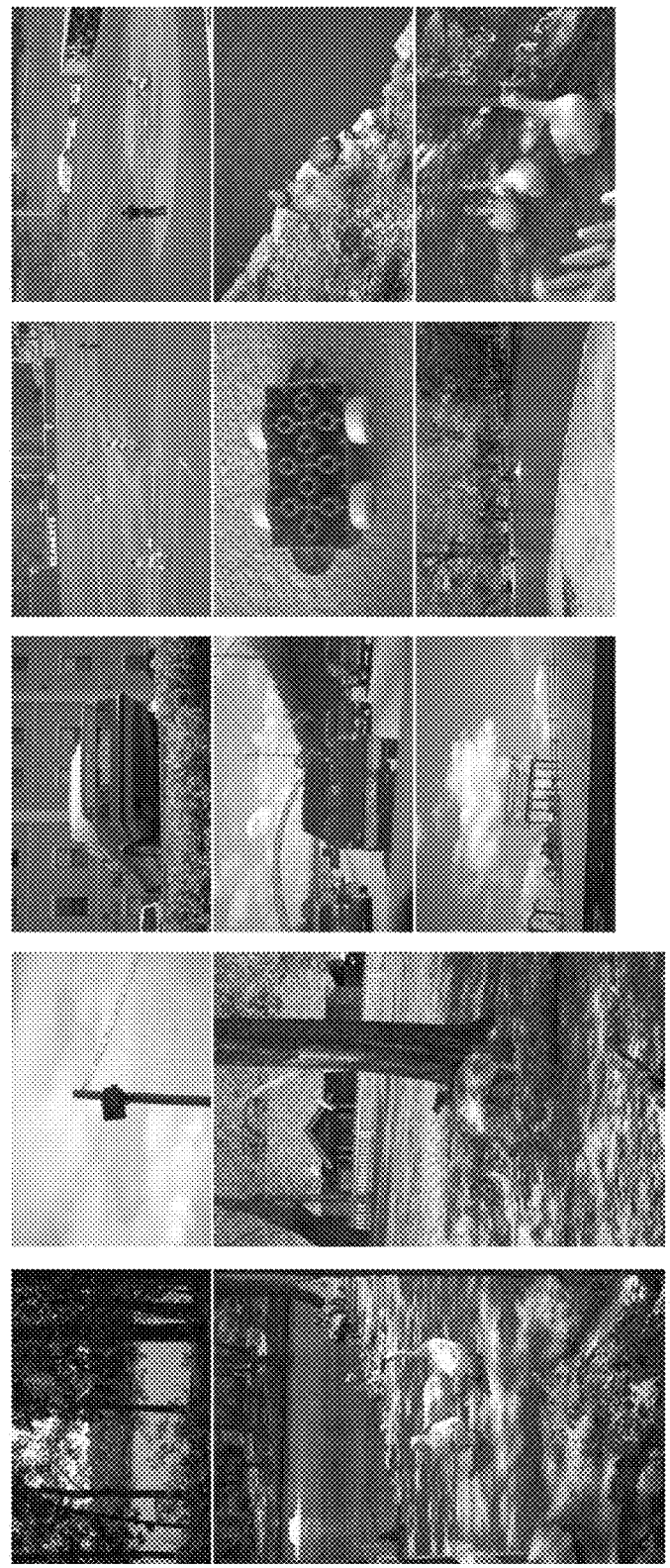
FIG. 3 shows untouched photos in JPEG format.
Figure 4:
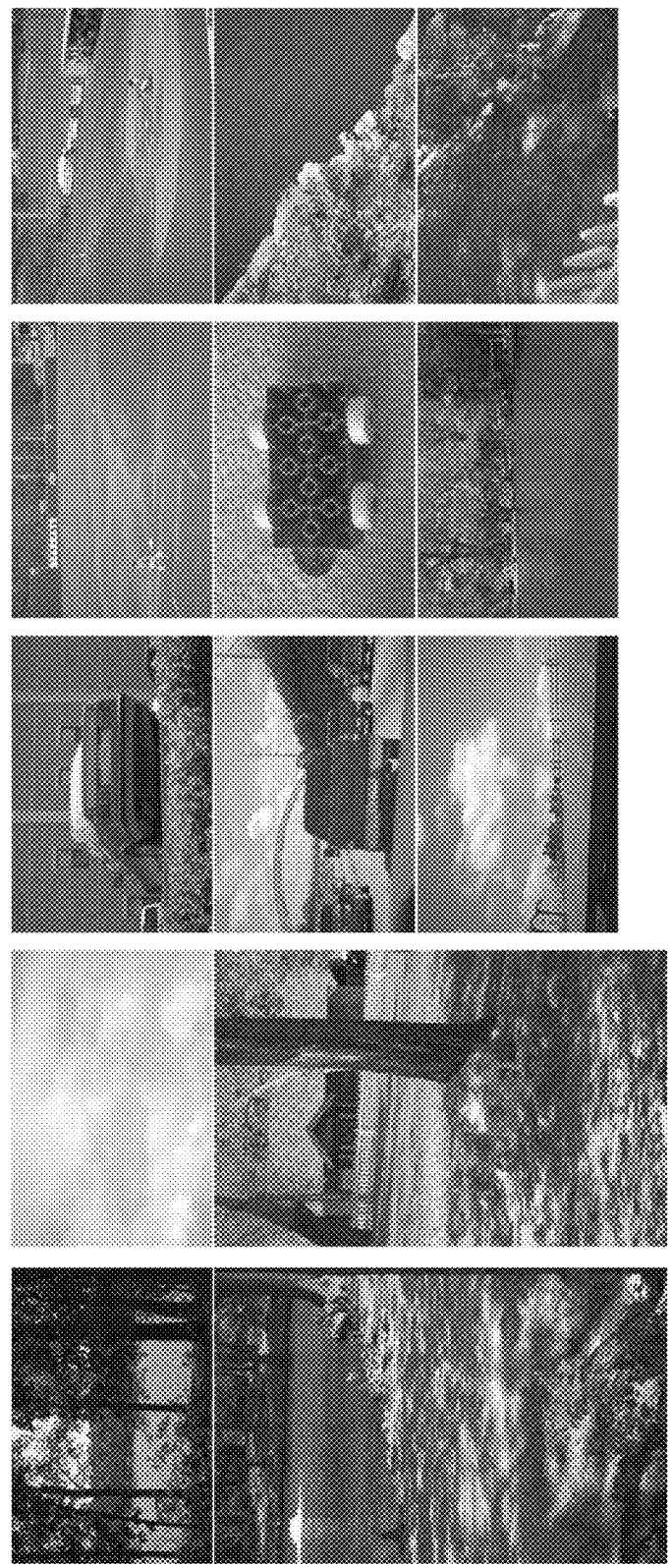
FIG. 4 shows tampered photos in JPEG format.

FIG. 3 shows untouched photos in JPEG format at quality '75'. FIG. 4 shows tampered photos in JPEG format at quality '75'. To detect the inpainting forgery under combined attacks from the photos, thirteen photos in JPEG were randomly selected at the quality of '75', shown in FIG. 3. Similar to previous experiments on inpainting forgery combination attacks, and the following combination attacks were defined, with the objective to distinguish the tampered regions from untouched.

Figure 5:
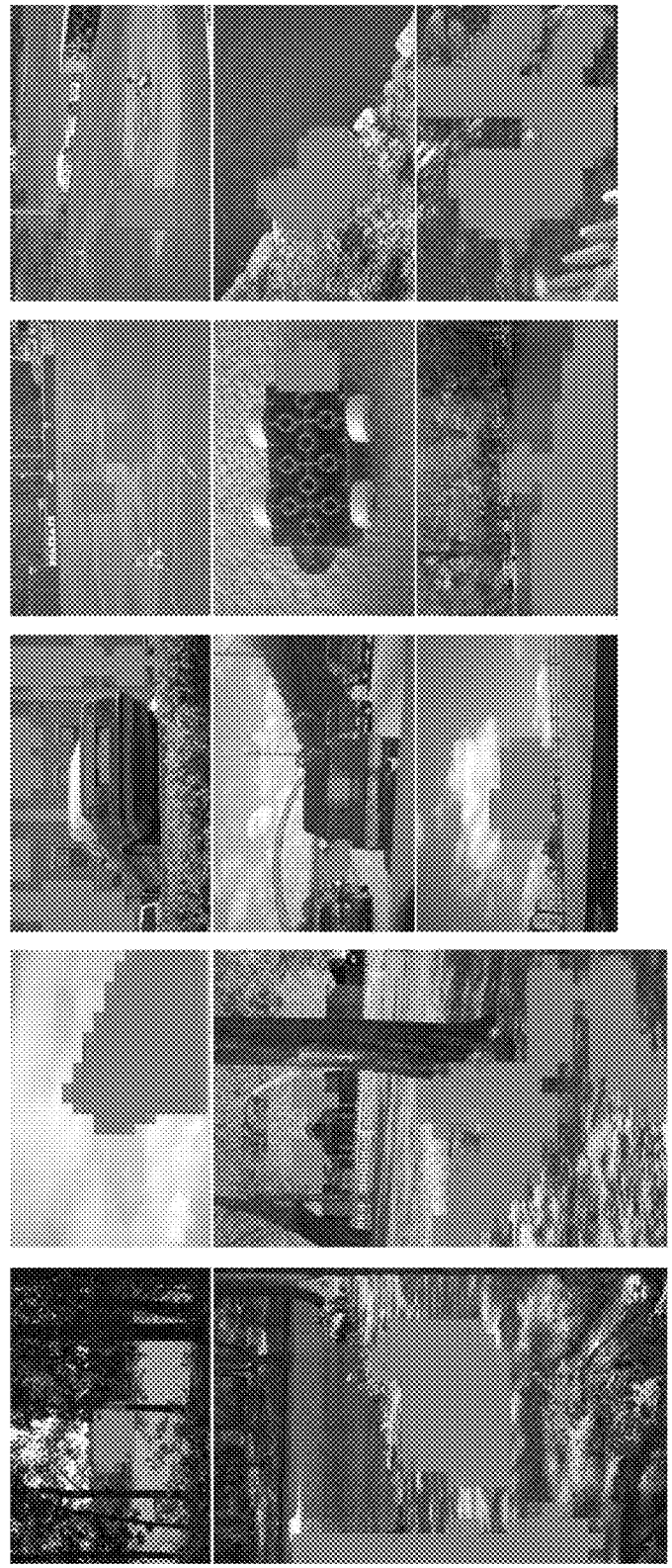
FIG. 5 shows images with indications of tampered regions of the photos of FIG. 4.

Combination Attack 1: After inpainting manipulation, doctored photos are saved in JPEG at the quality '75', the tampered photos are shown in FIG. 4. Tampered regions are indicated in FIG. 5. In FIG. 5, tampered regions are indicated in uniform gray shading where 20% pixels modified. Each 128×128 region was scanned by the step of 64 from the left to right, upper to bottom. The following attacks 2 to 4 are based on attack 1.

Combination Attack 2: Doctored photos are saved in JPEG at the quality of '75', followed by restoring the doctored photos in JPEG at the quality of '40';

Combination Attack 3: Doctored photos are saved in JPEG at the quality of '75', followed by down-scaling at the factor 0.8 and restoring in JPEG at the quality of '40';

Combination Attack 4: Doctored photos are saved in JPEG at the quality of '75', followed by median filtering and then restoring in JPEG at the quality of '40'.

In this experiment, detection scans each 128×128 region of photo from left to right, upper to bottom, by the step of 64 along horizontal direction and then the step of 64 along vertical direction. The 117,240-dimensional features from each 128×128 region, then apply existing classification model that may perform the best for detecting the examination region. The similarity of the 117,240-dimensional feature vector between the examination region and existing training sets are calculated at first, and the closest feature vectors to the examination feature vector, from both tampering and untouched categories, are used to construct the best matching model, or called dynamical modeling. It should be noted that the training set used for dynamical modeling does not contain any information about the examination data, in other words, training photo data do not have any overlapping with the examination region.

Figure 6:
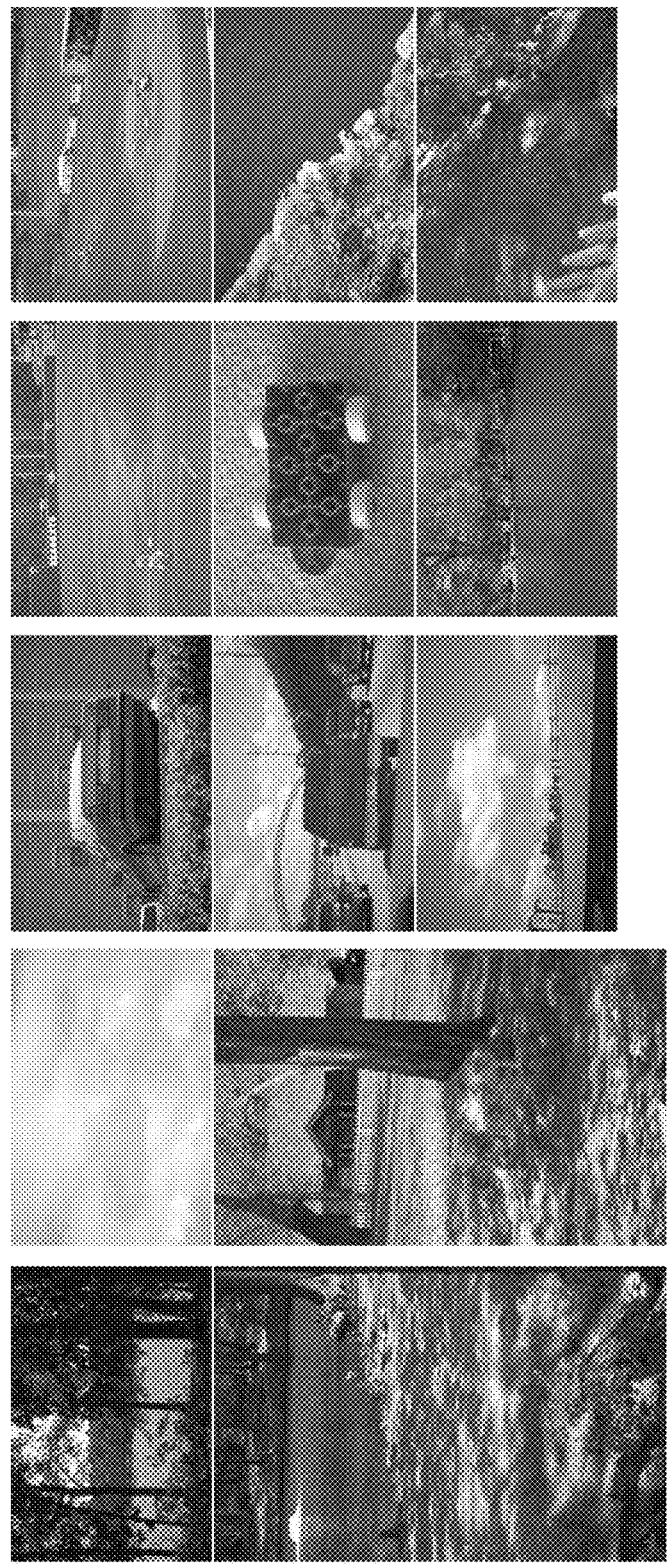
FIG. 6 shows detections results by fast copy-move detection and ZERNIKE methods in one experiment.

The detection experiments were first carried out under combination attack 1. FIG. 6 demonstrates the detection results by applying the fast copy-move detection method and ZERNIKE method. (no positive outcomes) Both detection results do not contain any positive predictions.

Figure 7:
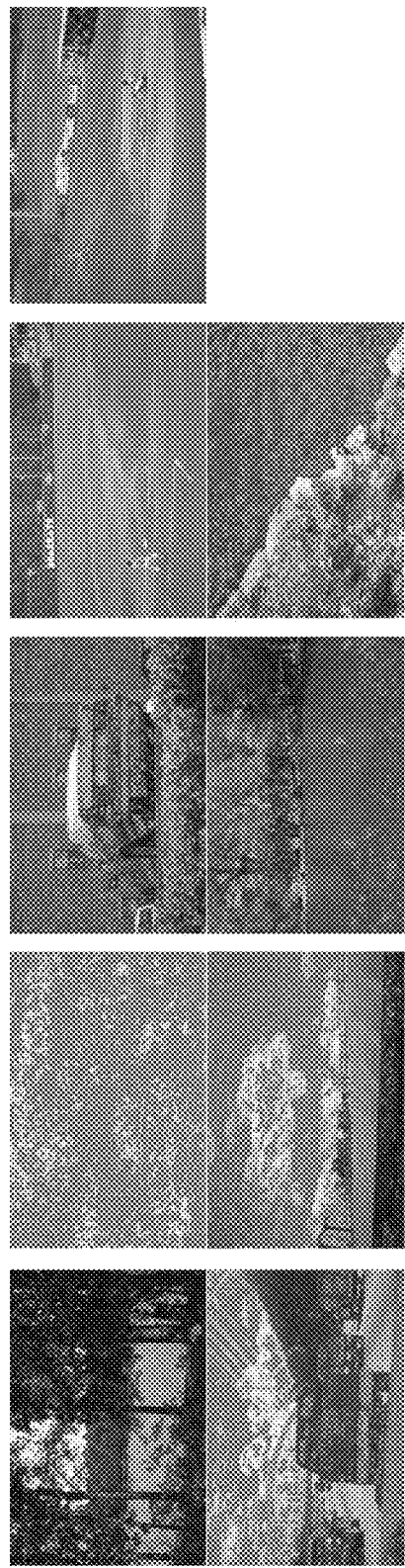
FIG. 7 shows detection results by blind inpainting method in one experiment.

FIG. 7 shows the detection results by using the blind inpainting forgery detection (positive prediction outcomes shaded). Due to the poor detection performance and high computational cost, the detection was completed for only 9 out 13 photos.—in this experiment, the detection results indicated that the method is was not capable of exposing the inpainting forgery.

Figure 8:
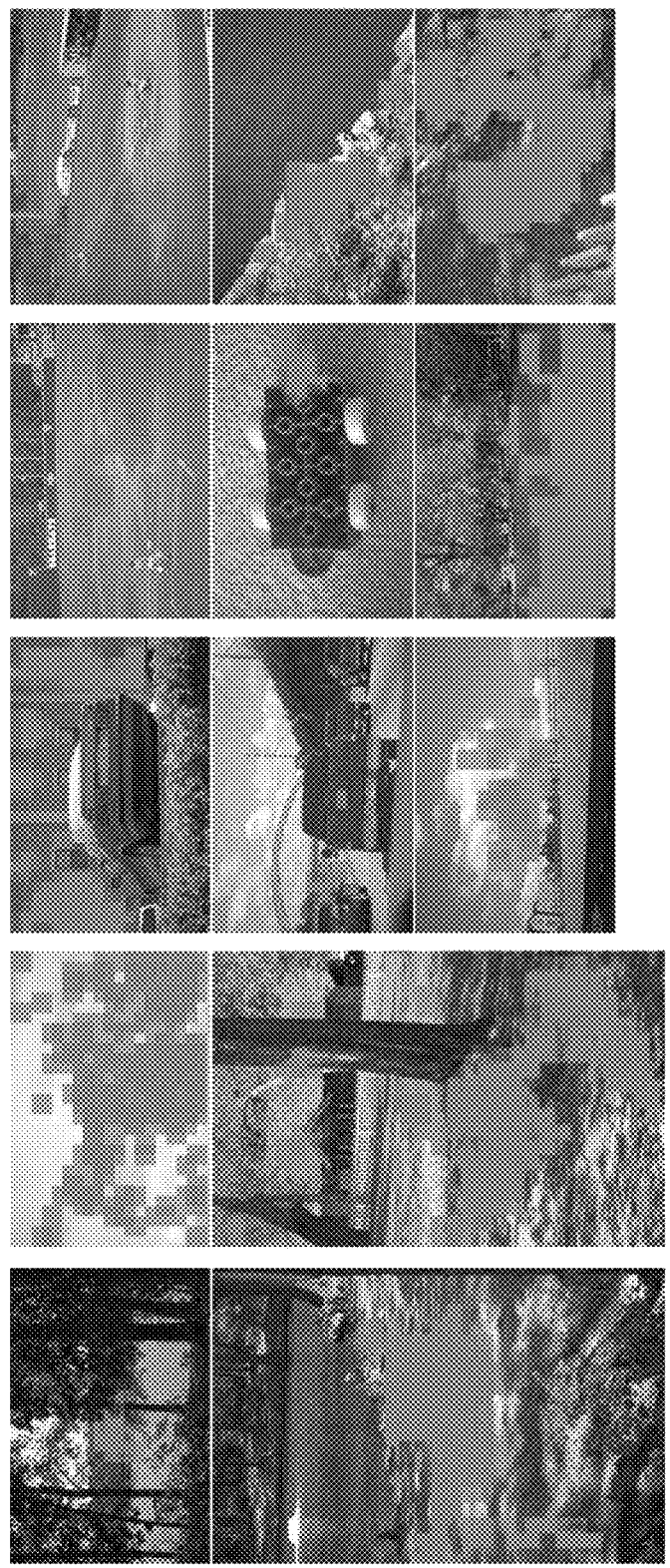
FIG. 8 gives the detection results of an experiment using LF-SDCT (large features in spatial derivatives and in DCT transform), based on combination attack 1.

FIG. 8 gives the detection results by using LF-SDCT, although the prediction outcomes are not 100% accurate, the method performs well in distinguishing tampered regions from untouched regions.

Figure 9:
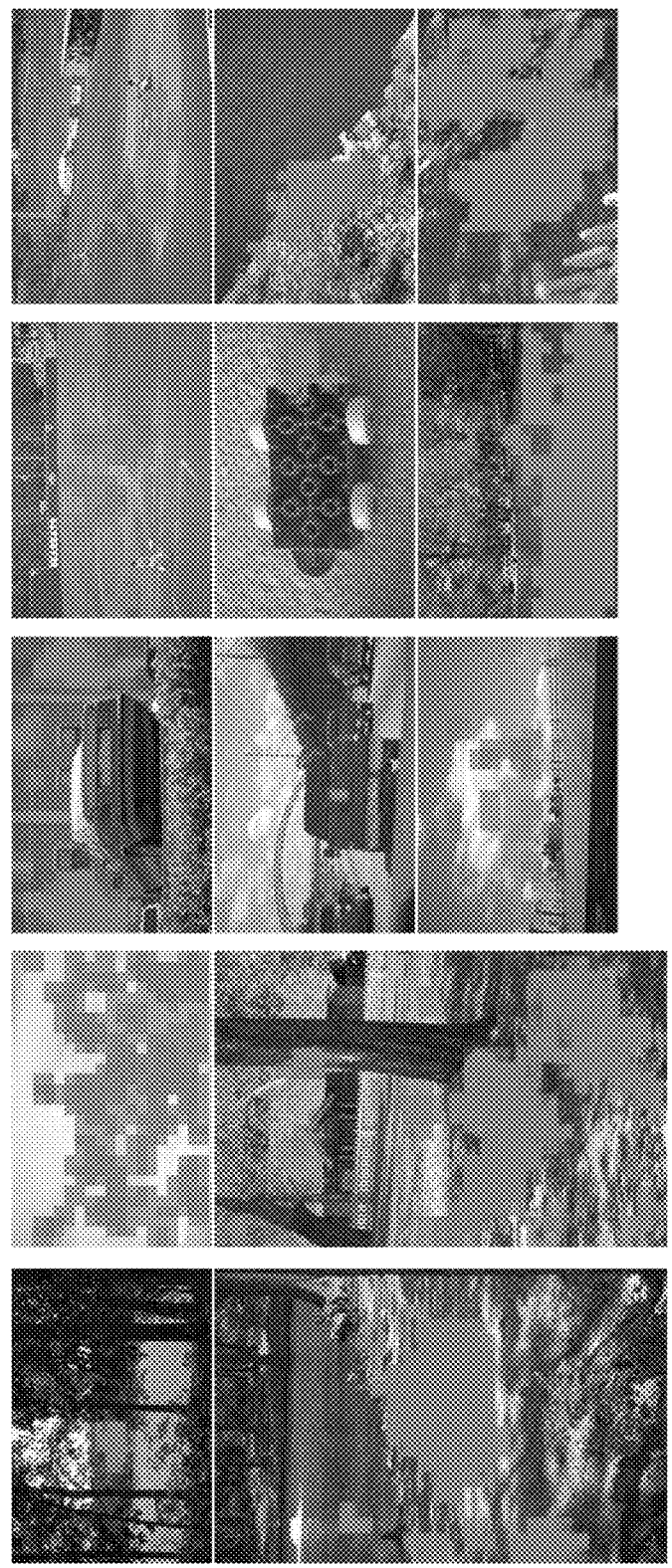
FIG. 9 gives the detection results by using LF-SDCT, based on combination attack 2.
Figure 10:
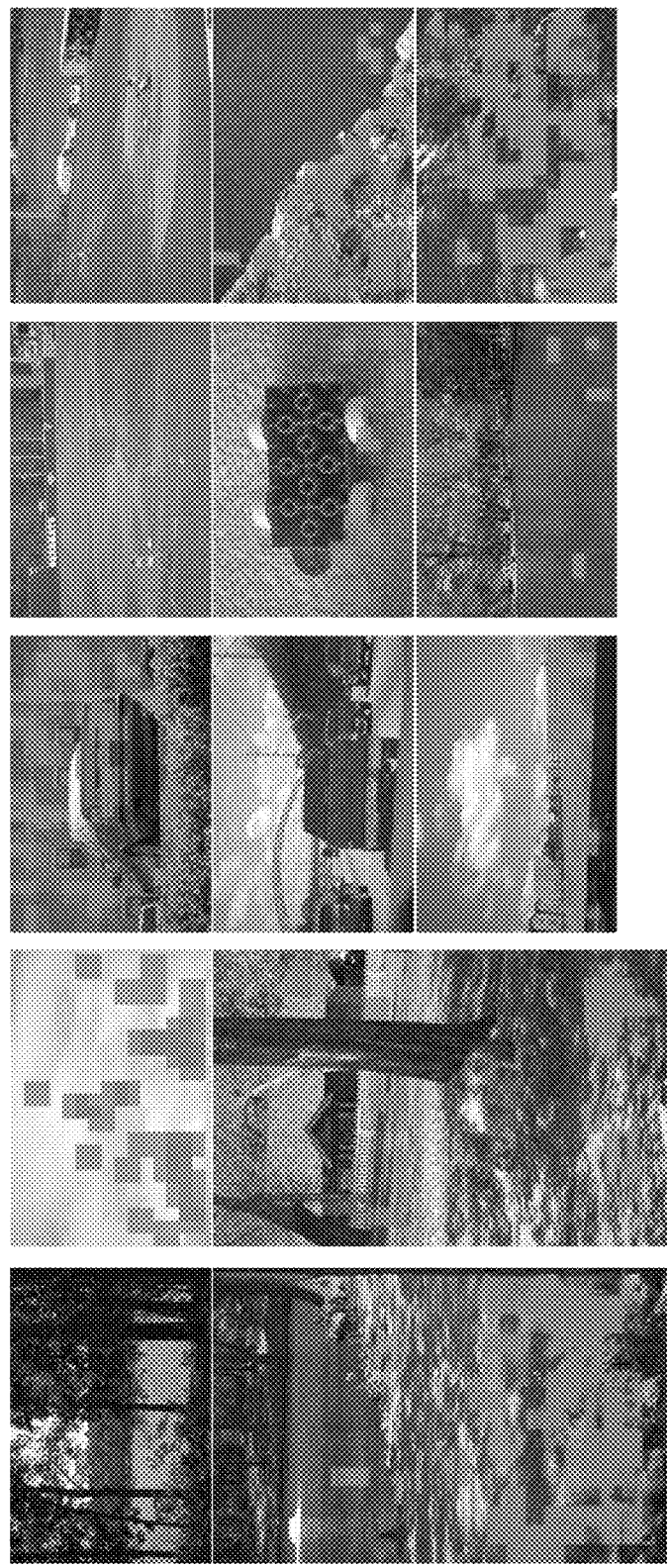
FIG. 10 gives the detection results by using LF-SDCT, based on combination attack 3.
Figure 11:
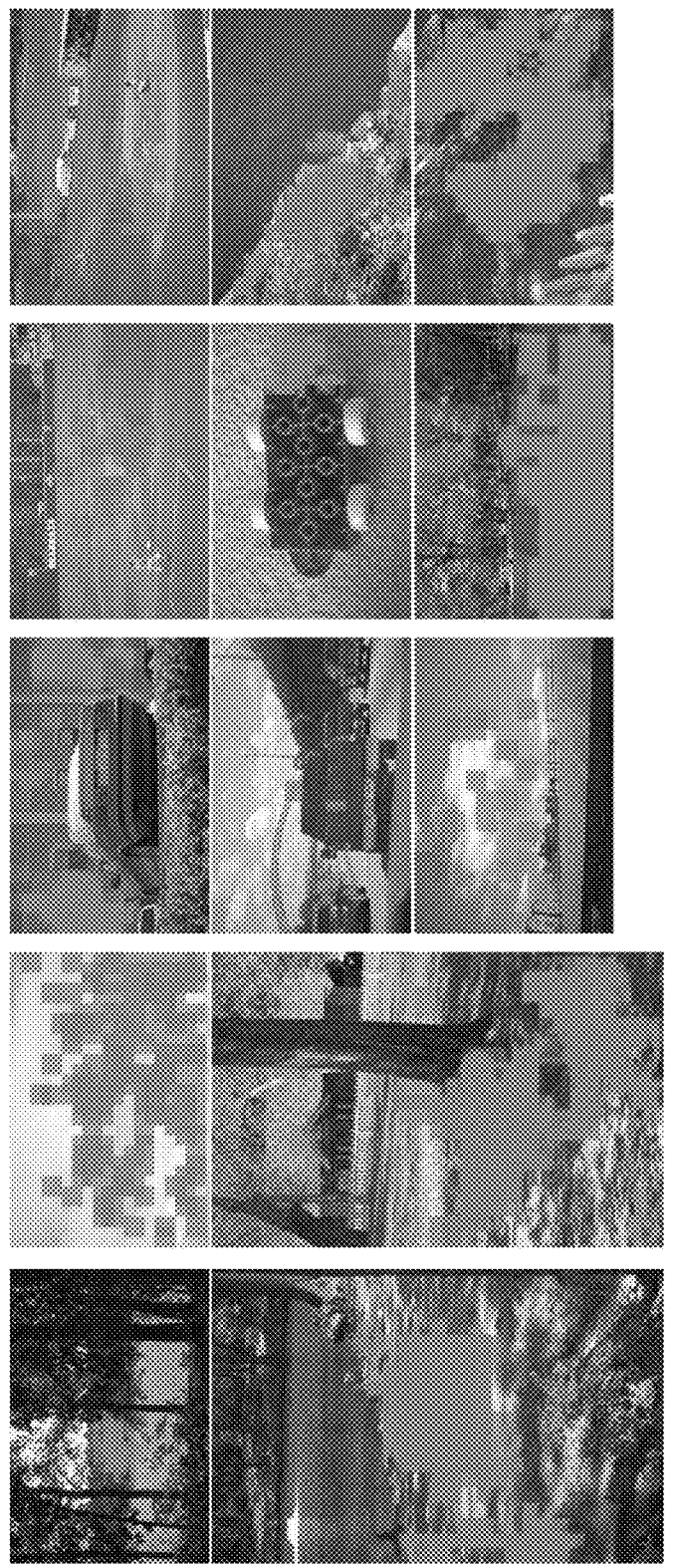
FIG. 11 gives the detection results by using LF-SDCT, based on combination attack 4.

Since combination attacks 2 to 4 are based on combination attack 1, and compared methods H. Lin, C. Wang and Y. Kao, "Fast copy-move forgery detection". *WSEAS Transactions on Signal Processing*, vol. 5, no. 5, pp. 188-197, 2009 ("Fast Copy-move Forgery Detection"); S. Ryu. M. Lee, and H. Lee, "Detection of copy-rotate-move forgery using Zernike moments", In *Proceedings of Information Hiding, Lecture Notes in Computer Science*, vol. 6387, pp. 51-65, June 2010 ("Zernike Moments"); and D. T. Trung, A. Beghdadi, and M. C. Larabi, "Blind inpainting forgery detection", *Proceedings of* 2014 *IEEE Global Conference on Signal and Information Processing*, pages 1019-1023 ("Blind Inpainting Forgery Detection"), are not effective in the combination attack 1 and these methods would not be expected to expose the tampering in the following combination attacks 2 to 4, the method was only examined for the forgery detection in combination attacks 2 to 4. The detection results are shown in FIG. 9, FIG. 10, and FIG. 11, respectively. Except that the performance on combination attack 3 is noticeably deteriorated, LF-SDCT is very promising to expose the tampered areas in combination attacks 2 and 4. It should be noted that if post analyses of the prediction outcomes, e.g., 4/8-connection analysis and density analysis, are carried out, the detection accuracy may be further improved. In addition, the detection performance may be improved by establishing more complete classification models according to different sizes of tampering in JPEG images and including more training samples.

In the experiments on combination attack 1, although the number of features in the approach described herein is tremendously larger than the other three methods, the examination time is not the highest. In the experiments, the computational costs by applying the four detection methods in detecting each single photo are ranked from the lowest to the highest: 1) approximately 2 minutes by using the fast copy-move detection method (described in the Fast Copy-move Forgery Detection reference); 2) about 1.5 hours by method; 3) about 3 days by using the ZERNIKE method (described in the Zernike Moments reference); and 4) about 6 days by using blind inpainting detection (described in the Blind Inpainting Forgery Detection).

This demonstrates that LF-SDCT may not perform well in exposing the tampering in combination attack 3, it is plausible that the down-scaling followed by down recompression mostly destroys the existing inpainting traces, therefore, and it is much less effective compared to the detection in other combination attacks. Even so, LF-SDCT is still very effective to discriminate the JPEG down recompression in combination attack 3 from the singly compressed JPEG images.

Figure 12A:
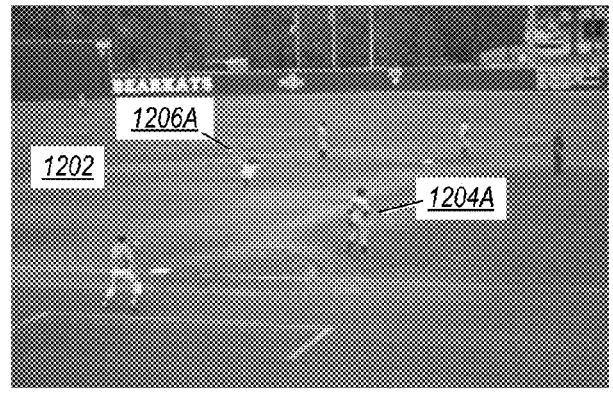
FIGS. 12A through 12C further illustrates detection forgery of an image of a baseball field.
Figure 12B:
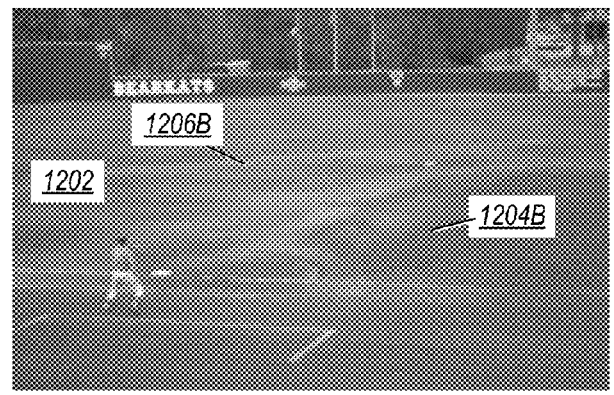
Figure 12C:
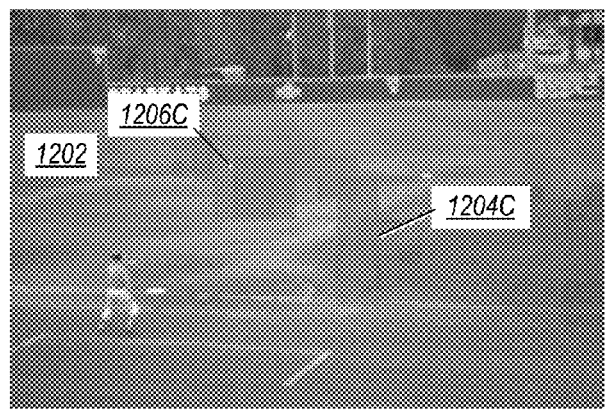

FIGS. 12A through 12C further illustrates detection forgery of an image of a baseball field. FIGS. 12A through 12C are the same as the corresponding images of the baseball field in FIGS. 3, 4, and 8. Thus, FIG. 12A shows an untouched photo of baseball field 1202 with several players in the infield, including infielder 1204A and baserunner 1206A. FIG. 12B shows a doctored photo of baseball field 1202 such that the players in infield are erased, as indicated, for example, by regions 1204B and baserunner 1206B. FIG. 12C shows an image in which shading produced using LF-SDCT for combination attack 1 is shown to indicated areas in which tampering was detected. In this case, the detected areas include, for example, regions 1204C and baserunner 1206C. Using the shading information produced using LF-SCDT, a forensics analysis would be prompted to investigate what the true content of the image was (in this, that there were in fact several players in the infield. In some embodiments, a digital image is generated that includes an indication (e.g., marking) showing portions of the image that have been altered. The indication may be in the form of shading, a color, symbols, tags, or pointers.

Figure 13:
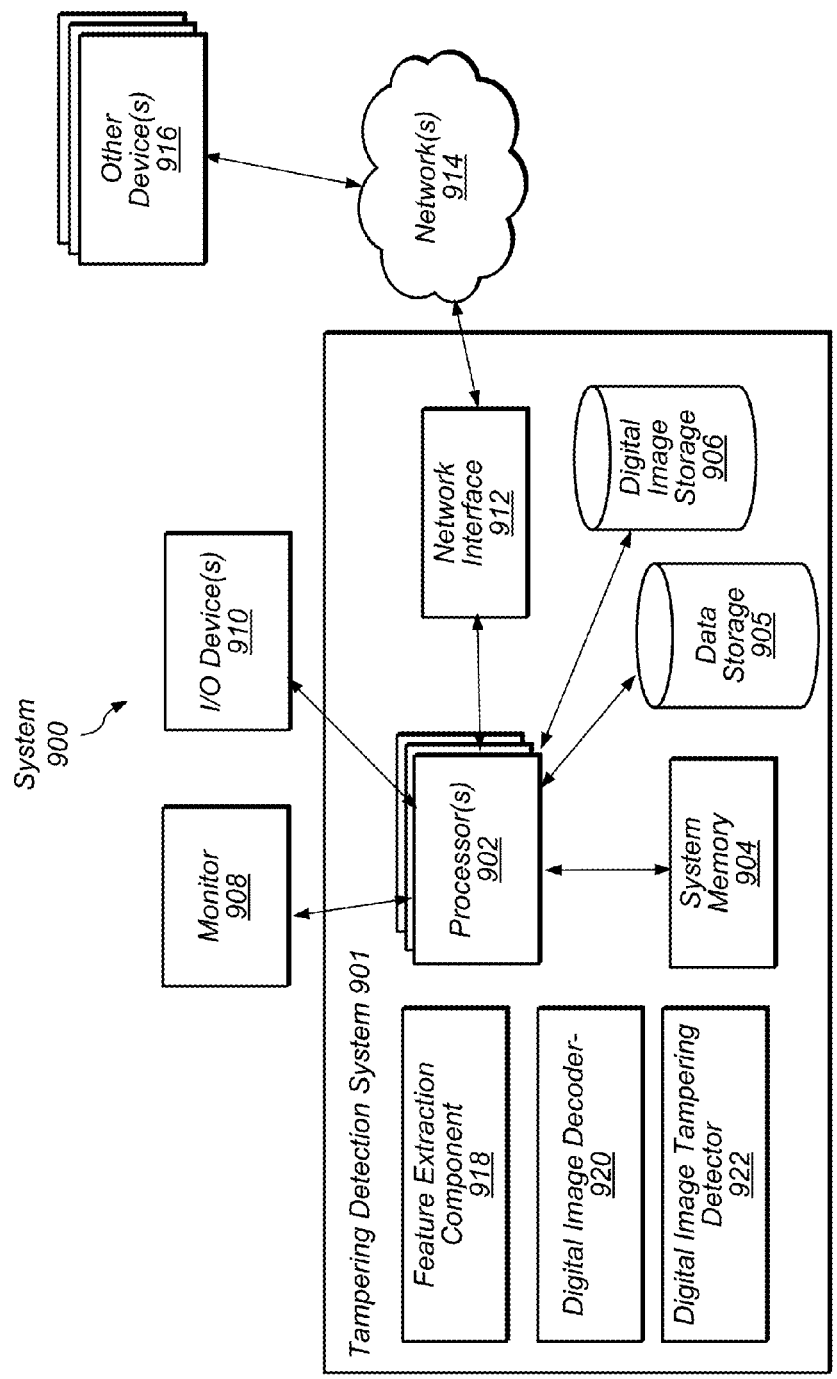
FIG. 13 illustrates a computer system that may be used in various embodiments to implement detection of image tampering and forensics.

FIG. 13 illustrates a computer system that may be used in various embodiments to implement detection of image tampering, including, in various embodiments, including down-compression or inpainting. System 900 includes tampering detection system 901. Tampering detection system 901 includes one or more processors 902, system memory 904, data storage device 905, and digital image storage device 906. Program instructions may be stored on system memory 904. Processors 902 may access program instructions on system memory 904. Processors 902 may access data (for example, for computations) on data storage device 905 and digital image data stored on digital image storage device 906. Users may be provided with information from system 900 by way of monitor 908. Users interact with computer system 900 by way of I/O devices 910. An I/O device 910 may be, for example, a keyboard or a mouse. Computer system 900 may include, or connect with, other devices 916. Elements of computer system 900 may connect with other devices 916 by way of network 914 via network interface 912. Network interface 912 may be, for example, a network interface card. In some embodiments, messages are exchanged between computer system 900 and other devices 916, for example, via a transport protocol, such as internet protocol.

In the embodiment shown in FIG. 13, tampering detection system 901 includes digital image feature extraction component 918, digital image decoder 920, and digital image tampering detector 922. Digital image feature extraction component 918 may extract neighboring joint density features from a digital image under scrutiny (for example, as described above relative to FIGS. 1-11). The digital image may be retrieved from digital image storage device 906. Digital image decoder 920 may decode the digital image. In some embodiments, a digital image or portion of a digital image is decoded into a spatial domain. Digital image tampering detector 922 may detect tampering in digital images under scrutiny. Tampering detection may include, in various embodiments described above relative to FIGS. 1-7, including rich feature mining, application of an ensemble classifier, applying a Fisher linear discriminant, or combinations thereof. Each of digital image feature extraction component 918, digital image decoder 920, and digital image tampering detector 922 may be implemented in one or more computing devices.

Exposing Seam Carving Forgery

In seam carving, to achieve content-aware scaling, unnoticeable pixels on the least important seams that blend with their surroundings are removed or inserted. Formally, let I be an n×m image and a vertical seam is defined by:

$$S^X = \{s_i^x\}_{i=1}^n = \{(x(i),i)\}_{i=1}^n, s.t. \forall j, |x(i)-x(i-1)| \leq 1 \quad (10)$$

where x is a mapping x: $[1, \ldots, n] \to [1, \ldots, m]$.

Similarly, a horizontal seam is defined by:

$$S^Y = \{s_j^y\}_{j=1}^m = \{(j,y(j))\}_{j=1}^m, s.t. \forall j, |y(j)-y(j-1)| \leq 1 \quad (11)$$

where y is a mapping y: $[1, \ldots, m] \to [1, \ldots, n]$.

The pixels of the path of seam S is denoted as $I_s$. Given an energy function e, the cost of a seam is calculated by: $E(s) = E(I_s) = \Sigma_{i=1}^n e(I(S_i))$. The optimal seam s* generally minimizes the seam cost:

$$s^* = \min_s E(s) = \min_s \sum_{i=1}^n e(I(s_i)) \quad (12)$$

Although no single energy function performs well across all images, in general the following two measures $e_1$ and $e_{HoG}$ work quite well.

$$e_1(I) = \left|\frac{\partial}{\partial x}I\right| + \left|\frac{\partial}{\partial y}I\right| \quad (13)$$

$$e_{HoG}(I) = \frac{\left|\frac{\partial}{\partial x}I\right| + \left|\frac{\partial}{\partial y}I\right|}{\max(HoG(I(x, y)))} \quad (14)$$

Where HoG (I(x,y)) is a histogram of oriented gradients at every pixel.

While seam carving has been widely used for content aware image resizing, it is also used for tampering illusion such as removing or inserting some objects. JPEG is a commonly used compression method for digital images. When a JPEG digital image is manipulated in spatial domain and then saved in JPEG format, it undergoes double compression. The detection of JPEG double compression has been well investigated in multimedia forensics. Given original JPEG image quality $QF_1$ (before tampering) and the manipulated image quality $QF_2$ (after tampering and saving in JPEG format), when the quality $QF_2$ is higher than $QF_1$, the detection of such a JPEG double compression is generally effective. However, when the quality $QF_2$ is lower than $QF_1$, most detection methods do not perform well. For example, in experimental results in detecting JPEG double compression using known methods when the first compression quality factor $QF_1$ is higher than 77 and the second compression factor $QF_2$ is lower than 57, detection accuracy is only about 50%.

According to the inefficacy of most existing JPEG double compression detection algorithms in the detection when the quality $QF_2$ is lower than $QF_1$, there is little or no detection of seam carving forgery in JPEG images. Thus, a forger may process a JPEG image by the operation of seam carving in spatial domain and store the manipulated JPEG image at a lower quality. In such a manipulation, the low-quality JPEG recompression may significantly destroy or compromise the traces left by seam carving. To our knowledge, when the manipulated images are saved at a lower-level JPEG quality, no methods have been propose that can detect the seam carving forgery.

A hybrid large scale feature mining-based approach can be used for discriminating seam carving forgery from untouched images.

Large Derivative and Energy Features

Image intensity change over the image is important information in image analysis and computer vision that has been used for many applications. The intensity change is described with the x and y derivatives $I_x$ and $I_y$, and the image gradient is the vector:

$$\nabla I = [I_x, I_y]^T$$

In this application the derivatives are expanded along different directions over different distances.

The derivative $I_{ij}$ is defined as the intensity change along the horizontal distance of i and along the vertical distance of j. Here the sum of i and j is the total offset distance of the derivative. We denote an image of size m×n by the pixel matrix M, $$M = \begin{bmatrix} a_{11} & a_{12} & \ldots & a_{1n} \\ a_{21} & a_{22} & \ldots & a_{2n} \\ \ldots & \ldots & \ldots & \ldots \\ a_{m1} & a_{m2} & \ldots & a_{mn} \end{bmatrix}$$

The derivative matrix of $I_{ij}$ is calculated by:

$$M_{I_{ij}} = \begin{bmatrix} a_{11} - a_{(j+1)(i+1)} & a_{12} - a_{(j+1)(i+2)} & \ldots & a_{1(n-i)} - a_{(j+1)n} \\ a_{21} - a_{(j+2)(i+1)} & a_{22} - a_{(j+2)(i+2)} & \ldots & a_{2(n-i)} - a_{(j+2)n} \\ \ldots & \ldots & \ldots & \ldots \\ a_{(m-j)1} - a_{m(i+1)} & a_{(m-j)2} - a_{m(i+2)} & \ldots & a_{(m-j)(n-i)} - a_{mn} \end{bmatrix} \quad (15)$$

$$= \begin{bmatrix} I_{ij}(1,1) & I_{ij}(1,2) & \ldots & I_{ij}(1,n-i) \\ I_{ij}(2,1) & I_{ij}(2,2) & \ldots & I_{ij}(2,n-i) \\ \ldots & \ldots & \ldots & \ldots \\ I_{ij}(m-j,1) & I_{ij}(m-j,2) & \ldots & I_{ij}(m-j,n-i) \end{bmatrix}$$

Spatial derivative large feature mining contains the marginal density and neighboring joint density. For computational efficiency and feature reduction, our feature extraction is based on the derivative matrices, the algorithm is described below.

---
Derivative-based large feature mining algorithm
---

```
for d=1:max_d
  for i=0:d
    j=d-i;
    % Marginal density features
    % δ = 1 if its arguments are satisfied, otherwise 0
      for h=0:max_h
```

$$MF_{ij}(h) = \frac{\sum_{r=1}^{m-j}\sum_{c=1}^{n-i} \delta(|I_{ij}(r,c)| = h)}{(m-j)(n-i)} \quad (16)$$

```
      end
    % Joint density features
      for k=0:max_k
        for l=0:max_l
```

$$NJH_{ij}(k,l) = \frac{\sum_{r=1}^{m-j}\sum_{c=1}^{n-i} \delta(|I_{ij}(r,c)| = k \,\&\, |I_{ij}(r,c+1)| = l)}{(m-j)(n-i)} \quad (17)$$

$$NJV_{ij}(k,l) = \frac{\sum_{r=1}^{m-j}\sum_{c=1}^{n-i} \delta(|I_{ij}(r,c)| = k \,\&\, |I_{ij}(r+1,c)| = l)}{(m-j-1)(n-i)} \quad (18)$$

```
        end
      end
  end
end
```

In one study, we set the values of 8, 10, 10, and 10 to max_d, max_h, max_k and max_l, respectively. We obtained 484 marginal density features, and 10,648 joint density features, for a sub-total of 11,132 features. Additionally, when image filtering is applied to the image M, the filtered version is obtained. By applying the feature extraction algorithm to the filtered version, another 11,132 feature are obtained.

Optimal seams are examined by the least importance based on the energy function. We surmise that the seam carving operation changes the statistics of importance distribution. Therefore, we designed the following features related the energy statistical features.

For the image $M=\{a_{ij}\}$ (i=1, 2 . . . m; j=1, 2 . . . n), and the parameters $s_1$ and $s_2$ are set to 1, 2, 3, respectively. The sub set X $(s_1, s_2, d_1, d_2)=\{a_{ij}\}$ (i=$s_1$+$d_1$+1, $s_1$+$d_1$+2, . . . , $s_1$+$d_1$+m−max($s_1$+$d_1$); j=$s_2$+$d_2$+1, $s_2$+$d_2$+2, . . . , n+$d_2$+$s_2$−max($d_2$+$s_2$)). The differential matrices are constructed by:

$$e(d_1, d_2) = \sum_{(s_1,s_2)=(1,1)}^{(3,3)} |X(s_1, s_2, d_1, d_2) - X(2, 2, , d_1, d_2)| \quad (19)$$

$$e_1(d_1, d_2) = \min_{s_2=1,2,3} |X(1, s_2, d_1, d_2) - X(2, 2, , d_1, d_2)| \quad (20)$$

$$e_2(d_1, d_2) = \min_{s_2=1,2,3} |X(3, s_2, d_1, d_2) - X(2, 2, , d_1, d_2)| \quad (21)$$

$$e_3(d_1, d_2) = \min_{s_2=1,2,3} |X(s_1, 1, d_1, d_2) - X(2, 2, , d_1, d_2)| \quad (22)$$

$$e_4(d_1, d_2) = \min_{s_2=1,2,3} |X(1, s_2, d_1, d_2) - X(2, 2, , d_1, d_2)| \quad (23)$$

Based on the differential matrix in equation (19), we extract the marginal density by $$absM_e(p) = \frac{\delta(e(0,0) = p)}{(n-2)*(m-2)} \quad (24)$$

The neighboring joint density features are given by:

$$absNJ_{e,d}^1(p,q) = \frac{\sum \delta(|e(0,0)| = p, |e(d_1,d_2)| = q)}{(n-d_1-2)(m-d_2-2)} \quad (25)$$

$$absNJ_{e,d}^2(p,q) = \frac{\sum \delta(|e_1(0,0)| = p, |e_2(d_1,d_2)| = q)}{(n-2)(m-2)} \quad (26)$$

$$absNJ_{e,d}^3(p,q) = \frac{\sum \delta(|e_3(0,0)| = p, |e_4(d_1,d_2)| = q)}{(n-2)(m-2)} \quad (27)$$

In equations (24), (25), (26) and (27), $\delta=1$ if its arguments are satisfied, otherwise $\delta=0$; the integer value of p and/or q is set from 0 to 10. In equation (25), the sum of $d_1+d_2$ is set from 1 to 7, there are 35 combinations of $(d_1, d_2)$. We obtain a total of 4488 features. Additionally, image filtering is applied to the image M, the filtered version is obtained. By applying the feature extraction from equations (24) to (27) to the filtered version, another 4488 features are obtained. In a subtotal, we obtain 8976 energy-based features.

Large Transform-Domain Features

The quantized DCT coefficient array of the image contains $B_1 \times B_2$ blocks. The $F_{pq}$-th block ($p=1, 2, \ldots, B_1$; $q=1, 2, \ldots, B_2$) consists of 8×8 quantized DCT coefficients. The coefficient at the frequency coordinate (u, v) of the block $F_{pq}$ (u=0, 1, ... 7, and v=0, 1, ... 7) is denoted by $c_{pq}(u, v)$. The marginal density of the absolute coefficients is given by absM:

$$absM(u,v;h) = \frac{\sum_{p=1}^{B_1}\sum_{q=1}^{B_2} \delta(|c_{pq}(u,v)| = h)}{B_1 B_2} \quad (28)$$

The individual frequency-based neighboring joint density on horizontal direction and vertical direction are given by:

$$absNJ_{1h}(u,v;x,y) = \frac{\sum_{p=1}^{B_1}\sum_{q=1}^{B_2} \delta(c_{pq}(u,v) = x \,\&\, c_{pq}(u,v+1) = y)}{B_1 B_2} \quad (29)$$

$$absNJ_{1v}(u,v;x,y) = \frac{\sum_{p=1}^{B_1}\sum_{q=1}^{B_2} \delta(c_{pq}(u,v) = x \,\&\, c_{pq}(u+1,v) = y)}{B_1 B_2} \quad (30)$$

The inter-block neighboring joint density on individual frequency band along the horizontal direction and vertical direction, the features are constructed as follows:

$$absNJ_{2h}(u,v;x,y) = \frac{\sum_{p=1}^{B_1}\sum_{q=1}^{B_2} \delta(c_{pq}(u,v) = x \,\&\, c_{p(q+1)}(u,v) = y)}{B_1(B_2-1)} \quad (31)$$

$$absNJ_{2v}(u,v;x,y) = \frac{\sum_{p=1}^{B_1}\sum_{q=1}^{B_2} \delta(c_{pq}(u,v) = x \,\&\, c_{(p+1)q}(u,v) = y)}{(B_{1-1})B_2} \quad (32)$$

In equations (28) to (32), $\delta=1$ if its arguments are satisfied, otherwise $\delta=0$; h is the integer from 0 to 5, x and y are integers ranging from 0 to 4. The frequency coordinate pair (u, v) is set to (0,1), (1,0), (2,0), (1,1), (0,2), (0,3), (1,2), (2,1), (3,0), (4,0), (3,1), (2,2), (1,3), and (0,4), a subtotal of 84 marginal density features, 700 joint density features on the intra-block, and 700 joint density features on the inter-block. The calibration features in the DCT domain is generated according to the following processing:

Decode the JPEG image under examination to spatial domain, which is denoted by matrix M. For $d_1=0$ to 7, and $d_2=0$ to 7, while $(d_1,d_2) \neq (0,0)$:

1) Crop the matrix M by $d_1$ rows and $d_2$ columns in the spatial domain, and generate a shifted spatial image:

$$M_{d_1 d_2}(d_1,d_2) \in \{(0,1), \ldots, (0,7), (1,0), \ldots, (7,7)\};$$

2) Compress the shifted spatial image $M_{d1d2}$ to the JPEG format at the same quality factor;
3) Extract the marginal density and neighboring joint density features calculated by equations (28) to (32) respectively.

In the DCT domain, we extract 64*(84+700+700)=94,976 features, denoted by LF-DCT (large features in DCT transform). By integrating all features from both the spatial domain and the DCT domain together, a total of 126,216 features, denoted by LF-DEDCT (large features on Derivatives, Energy and DCT transform), are generated.

EXPERIMENTAL TESTING OF METHOD FOR DETECTION OF SEAM-CARVING

3600 JPEG color images were encoded at the quality of '75'. The seam carving tool at http://code.google.com/p/seamcarvinggui/ is used to manipulate these JPEG images. Doctored images are stored in JPEG at the same quality '75'. Untouched 3600 JPEG images are also uncompressed and stored at the same quality '75'. Both untouched and doctored images are transcoded to the quality of '40'. The task is set to discriminate the doctored images of quality '40' from the untouched of quality '40'.

We compared our detectors LF-DCT and LF-DEDCT to other detectors within the state-of-the-art, including cc-absNJ, as set forth in Liu et al. (2014) "Improved approaches with calibrated neighboring joint density to steganalysis and seam-carved forgery detection in JPEG images" ACM Trans. on Intelligent Systems and Technology, 5(4): article 63, which is incorporated herein by reference. Other detection methods that were compared to the detection schemes described herein include: the Markov-Y detection method, the Markov-Cr detection method, the Markov-Cb detection method and the Markov-YCrCb detection method, as described in Wang et al. (2010) "Image tampering detection based on stationary distribution of Markov chain", Proc 17th International Conference on Image Processing, pages 2101-2104, September 2010, which is incorporated herein by reference; the "Chang" detection method described in Chang et al. (2013), "Detection of seam carving in JPEG images" Awareness science and technology and ubi-media computing, international conference on IEEE, 2013, pp, 632-638, which is incorporated herein by reference; the "Ryu/Lee" detection method described in Ryu et al. (2014), "Detecting trace of seam carving for forensics analysis", IEICE Trans.

Inform. Syst. 2014, 97(5): 1304-1311, which is incorporated herein by reference; the "Wei" detection method described in Wei et al. (2014) "A patch analysis method to detect seam carved images", Pattern Recognition Letter, 36: 100-106, 2014, which is incorporated herein by reference; and the "Yin" detection method described in Yin et al. (2015), "Detecting seam carving based image resizing using local binary patterns", Computers & Security, 55:130-141, 2015, which is incorporated herein by reference. Ensemble learning, as described in Kodovsky et al. (2012) "Ensemble classifiers for steganalysis of digital media" IEEE Transactions on Information Forensics and Security, 7(2):432-444, which is designed for image steganalysis to deal with large scale features and to avoid overfitting, is applied to our proposed detectors.

Table VIII lists the mean accuracy over 30 experiments by applying the ensemble classifier in detecting untouched JPEG images (quality of '40') and doctored JPEG images (quality of '40'). In each experiment, 67% observations are randomly selected for training and other 33% observations are used for testing. The prediction outcomes of testing sets are classified as True Positive (TP), False Positive (FP), False Negative (FN), and True Negative (TN). The detection accuracy is given by 0.5*TP/(TP+FN)+0.5*TN/(TN+FP). Compared to the existing neighboring joint density feature set, cc-absNJ, the integration of spatial differential neighboring joint density and DCT domain-based marginal and neighboring joint density improve the detection accuracy by about 20%; compared to other methods, the detection accuracy is improved by about 40%. Additionally, the classification accuracy in detecting the seam carving forgery under the recompression attack on the same quality of '75' was tested. Table IX lists the mean detection accuracy. The results shown in Table IX also demonstrates significant improvement in terms of the detection accuracy by methods described herein.

TABLE VIII

| Feature set or detection method | Detection accuracy (%) |
|---|---|
| Markov-Y | 51.1 |
| Markov-Cr | 53.1 |
| Markov-Cb | 53.1 |
| Markov-YCrCb | 54.4 |
| Chang | 53.5 |
| Yin | 51.9 |
| Wei | 51.8 |
| Ryu/Lee | 56.4 |
| cc-absNJ | 74.5 |
| LF-DCT | 89.8 |
| LF-DEDCT | 94.1 |

TABLE IX

| Feature set or detection method | Detection accuracy (%) |
|---|---|
| Markov-Y | 52.7 |
| Markov-Cr | 56.3 |
| Markov-Cb | 56.5 |
| Markov-YCrCb | 62.2 |
| Chang | 63.9 |
| Yin | 55.4 |
| Wei | 51.9 |
| Ryu/Lee | 64.4 |
| cc-absNJ | 93.0 |
| LF-DCT | 94.4 |
| LF-DEDCT | 99.3 |

To expose the seam carving forgery under JPEG recompression attacks, which had not been well explored in literature, we developed a hybrid large scale feature mining-based approach, consisting of over 100,000 features. Known ensemble learning techniques are adopted to deal with the high dimensionality and to recognize the patterns of untouched images and doctored from recompressed images at the same or lower quality. Our experiments demonstrate the effectiveness of proposed big feature mining-based approach. The methods described herein may be improved by including more reasonable features such as the distortion of the structural information that may be caused by seam carving. Feature selection and feature reduction may also be used to improve accuracy.

Computer systems may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method of detecting tampering in a digital image, comprising:
    mining one or more features of a digital image under scrutiny based on a spatial derivative, wherein mining the one or more features based on the spatial derivative comprises:
    determining a spatial derivative associated with at least a portion of a digital image under scrutiny; and
    extracting, based on the spatial derivative, one or more neighboring joint density features and marginal features from the digital image;
    mining one or more features of the digital image using at least one DCT transform, wherein mining one or more features of the digital image by the at least one DCT transform comprises:
    extracting one or more neighboring joint density features and marginal joint density features from the digital image; and
    determining one or more calibration features in a DCT domain based on the neighboring joint density features and marginal joint density features; and
    detecting tampering in the digital image under scrutiny at least in part by the features mined based on the spatial derivative and at least in part by the features mined using the at least one DCT transform;
    wherein detecting tampering in the digital image under scrutiny comprises detecting inpainting under combined attacks.

2. The method of claim 1, wherein detecting tampering in the digital image under scrutiny comprises detecting in painting in at least a portion of the digital image.

3. The method of claim 1, wherein detecting tampering in the digital image under scrutiny comprises detecting seam carving in at least a portion of the digital image.

4. The method of claim 1, wherein detecting tampering in the digital image under scrutiny comprises determining that the digital image is a forgery from at least one post-combination attack.

5. The method of claim 1, wherein detecting tampering in the digital image under scrutiny comprises detecting seam carving under combined attacks.

6. The method of claim 1, wherein the digital image comprises inpainting removing an object from the digital image.

7. The method of claim 1, wherein the digital image comprises inpainting adding an object to the digital image.

8. The method of claim 1, wherein mining one or more features of the digital image using at least one DCT transform comprises merging marginal joint density and neighboring joint density.

9. The method of claim 1, wherein mining one or more features of a digital image under scrutiny based on a spatial derivative comprises merging marginal joint density and neighboring joint density.

10. The method of claim 1, wherein the spatial derivative is based at least in part on image intensity changes.

11. The method of claim 1, wherein detecting tampering in the digital image under scrutiny comprises detecting down-recompression of at least a portion of the digital image.

12. The method of claim 1, wherein detecting tampering in the digital image under scrutiny comprises detecting inpainting forgery in the same quantization.

13. The method of claim 1, wherein detecting tampering in the digital image comprises rich feature mining.

14. The method of claim 1, wherein detecting tampering in the digital image comprises applying an ensemble classifier.

15. The method of claim 1, wherein detecting tampering in the digital image comprises applying a Fisher linear discriminant.

16. The method of claim 1, wherein the at least a portion of the features are determined according to different frequency coordinates in a DCT domain and under a shift recompression version.

17. The method of claim 1, wherein the digital image is a JPEG image.

18. The method of claim 1, wherein detecting tampering comprises distinguishing between single compression and down compression.

19. The method of claim 1, further comprising:
    generating a digital image comprising with distinguishing features in one or more regions that have been tampered with from an original image; and
    displaying the image with the indications of at least one of the regions that have been tampered with to a user.

20. A system, comprising:
    one or more computing devices, each of the one or more computing devices comprising a processor and a memory for storing program instructions wherein the program instructions, when executed on one or more computers, cause the one or more computers to implement a digital image tampering detection method comprising;
    mining one or more features of a digital image under scrutiny based on a spatial derivative, wherein mining the one or more features based on the spatial derivative comprises:
    determining a spatial derivative associated with at least a portion of a digital image under scrutiny; and
    extracting, based on the spatial derivative, one or more neighboring joint density features and marginal features from the digital image;
    mining one or more features of the digital image using at least one DCT transform, wherein mining one or more features of the digital image by the at least one DCT transform comprises:
    extracting one or more neighboring joint density features and marginal joint density features from the digital image; and
    determining one or more calibration features in a DCT domain based on the neighboring joint density features and marginal joint density features; and
    detecting tampering in the digital image under scrutiny at least in part by the features mined based on the spatial derivative and at least in part by the features mined using the at least one DCT transform;

wherein detecting tampering in the digital image under scrutiny comprises detecting inpainting under combined attacks.

21. A non-transitory, computer-readable storage medium comprising program instructions stored thereon, wherein the program instructions, when executed on one or more computers, cause the one or more computers to implement a digital image tampering detection system configured to:

mining one or more features of a digital image under scrutiny based on a spatial derivative, wherein mining the one or more features based on the spatial derivative comprises:

determining a spatial derivative associated with at least a portion of a digital image under scrutiny; and extracting, based on the spatial derivative, one or more neighboring joint density features and marginal features from the digital image;

mining one or more features of the digital image using at least one DCT transform, wherein mining one or more features of the digital image by the at least one DCT transform comprises:

extracting one or more neighboring joint density features and marginal joint density features from the digital image; and determining one or more calibration features in a DCT domain based on the neighboring joint density features and marginal joint density features; and detecting tampering in the digital image under scrutiny at least in part by the features mined based on the spatial derivative and at least in part by the features mined using the at least one DCT transform;

wherein detecting tampering in the digital image under scrutiny comprises detecting inpainting under combined attacks.

* * * * *